US012688174B1

(12) United States Patent (10) Patent No.: US 12,688,174 B1
Totapally et al. (45) Date of Patent: Jul. 21, 2026

(54) CONFIGURATION DRIVEN CONTROLS FRAMEWORK

(71) Applicant: THE HUNTINGTON NATIONAL BANK, Columbus, OH (US)

(72) Inventors: Mahesh Totapally, Columbus, OH (US); Megan Watkins, Columbus, OH (US); Willie Tackett, Columbus, OH (US); Anitha Manoharan, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/430,925

(22) Filed: Dec. 23, 2025

(51) Int. Cl.
　　*G06F 16/00* 　　(2019.01)
　　*G06F 11/07* 　　(2006.01)
　　*G06F 16/215* 　　(2019.01)
(52) U.S. Cl.
　　CPC ........ *G06F 16/215* (2019.01); *G06F 11/0751* (2013.01); *G06F 2201/80* (2013.01); *G06F 2201/81* (2013.01)
(58) Field of Classification Search
　　CPC ................................................... G06F 16/215
　　See application file for complete search history.

(56) References Cited

U.S. PATENT DOCUMENTS

2020/0412767 A1 * 12/2020 Crabtree ............. H04L 63/1441

* cited by examiner

*Primary Examiner* — Ajith Jacob
(74) *Attorney, Agent, or Firm* — Kilpatrick Townsend & Stockton LLP

(57) ABSTRACT

A system and method are disclosed for processing input data in a multi-phase data processing pipeline. The system receives input data associated with an identifier and a plurality of attributes. Based on the identifier and attributes, the system determines one or more control requirements relevant to a first phase of the pipeline. For each control requirement, a corresponding function is selected and executed, producing control requirement results that are stored. The system modifies the input data in response to the control requirement results and according to the requirements of the first phase. The system stores the modified input data in a data store. A payload is generated containing the modified input data, the set of control requirement results, and the attributes. The system determines a subsequent phase based on the current phase and transmits the payload to that next phase for further processing.

20 Claims, 7 Drawing Sheets

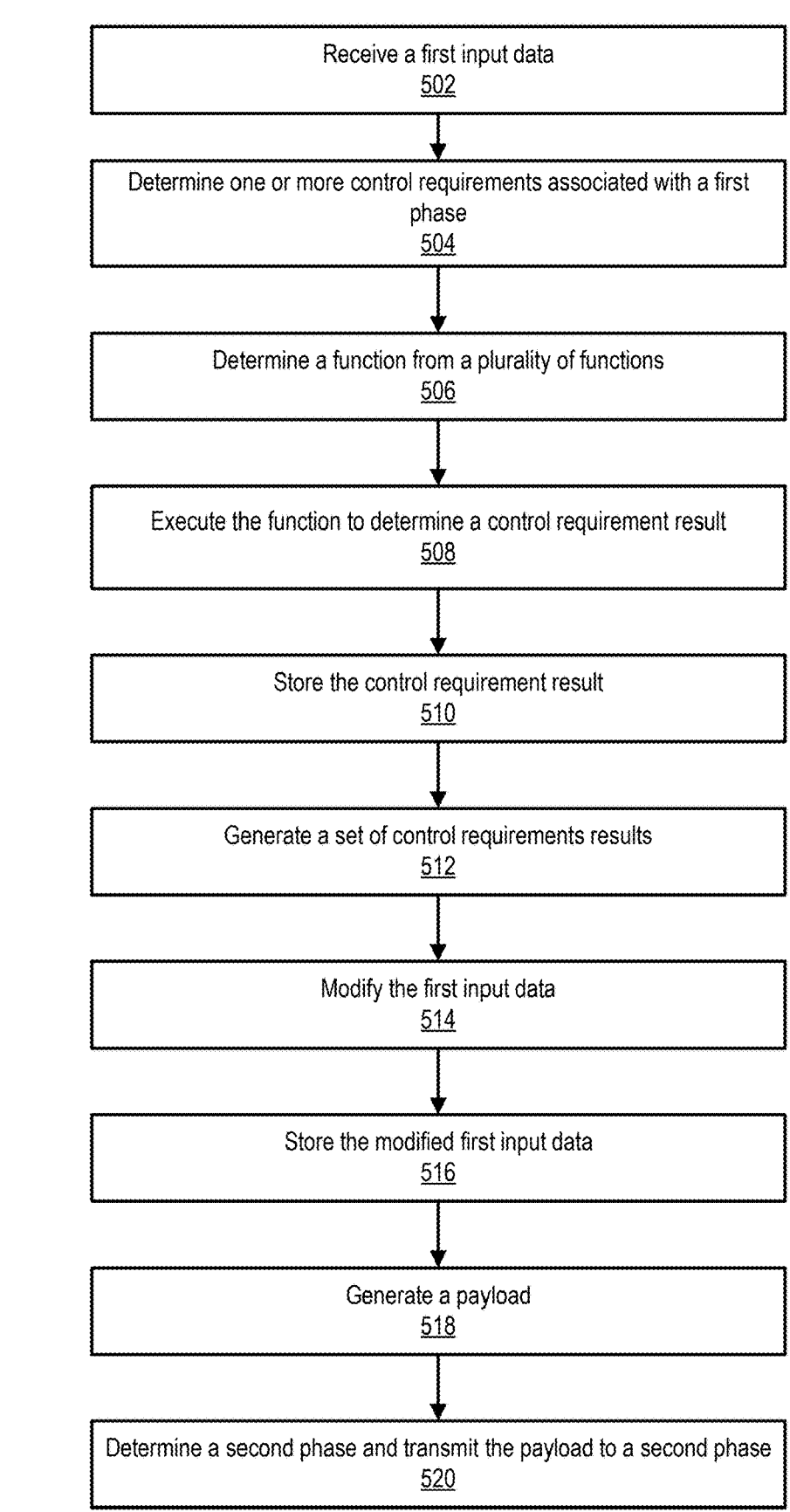

500

Receive a first input data
502

Determine one or more control requirements associated with a first phase
504

Determine a function from a plurality of functions
506

Execute the function to determine a control requirement result
508

Store the control requirement result
510

Generate a set of control requirements results
512

Modify the first input data
514

Store the modified first input data
516

Generate a payload
518

Determine a second phase and transmit the payload to a second phase
520

*FIG. 5*

CONFIGURATION DRIVEN CONTROLS FRAMEWORK

TECHNICAL FIELD

This disclosure relates generally to systems and methods for distributed data processing and data control management. Implementations can support multi-stage data pipelines that manage, ingest, transform, validate, and distribute data. The techniques described can support event-driven processing across cloud, on-premises, and hybrid computing environments.

BACKGROUND

Many entities rely on multi-stage data processing pipelines to manage aspects of data processing such as ingestion, transformation, validation, and distribution of said data. Input data may arrive unstructured, semi-structured, or heterogeneous, and may need to be processed in large volumes. To operate reliably, entities need to be able to process data of various forms while maintaining data integrity in accordance with applicable data controls at each phase of processing. This can become cumbersome and error-prone when each phase of a multi-stage pipeline has distinct data controls and/or requirements and when each data type has its own control requirements. Each time the data is handed off to another phase in the pipeline or used for other downstream operations, it can be critical to ensure that control requirements are applied and recorded.

Existing approaches to processing data and maintaining the integrity of data through data controls in multi-stage data processing pipelines can be ad hoc or rely on bespoke functions or tools that may require configuration per control, data type, or pipeline phase. These approaches can be time- and resource-intensive to set up and maintain, and they can struggle to adapt when new control requirements are introduced or when existing controls are modified. Architectural changes to the pipeline, computing environment, or other system components can further complicate maintenance and scaling, particularly when components are tightly coupled, since changes to one component can create ripple effects that require updates throughout the framework. These and other limitations can reduce scalability and portability across different computing environments.

SUMMARY

Various examples are described including systems, methods, and devices relating to integrated data processing and integrity management across multi-phase data pipelines using configuration-driven control, dynamic validation, and automated orchestration. Various embodiments are described herein, including methods, systems, non-transitory computer-readable storage media storing programs, code, or instructions executable by one or more processors, and the like.

A method is provided for processing input data within a multi-phase data processing pipeline. The method includes receiving input data associated with an identifier and a set of attributes, such as data type, source, or schema version. Based on the identifier and these attributes, one or more control requirements relevant to the first phase of the pipeline is selected. For each selected control requirement, the method further identifies and executes a corresponding function and stores the resulting outcome. After generating the control requirement results, the method further modifies the input data in response to these results and according to the requirements of the first phase. The modified data is then stored in a designated data store. The method further generates a payload containing the modified input data, the set of control requirement results, and the relevant attributes. This payload is used to determine the next (second) processing phase and is transmitted forward, enabling each subsequent phase to apply its own specific processing and validation as the data progresses through the pipeline.

Other embodiments of this invention include corresponding computer systems, apparatus, and computer programs recorded on one or more computer storage devices, each configured to perform the actions of the described methods.

BRIEF DESCRIPTION OF THE DRAWINGS

FIG. 5 is a block diagram illustrating an example method for event-driven data control processing, in accordance with at least one embodiment;

DETAILED DESCRIPTION

Figure 1:
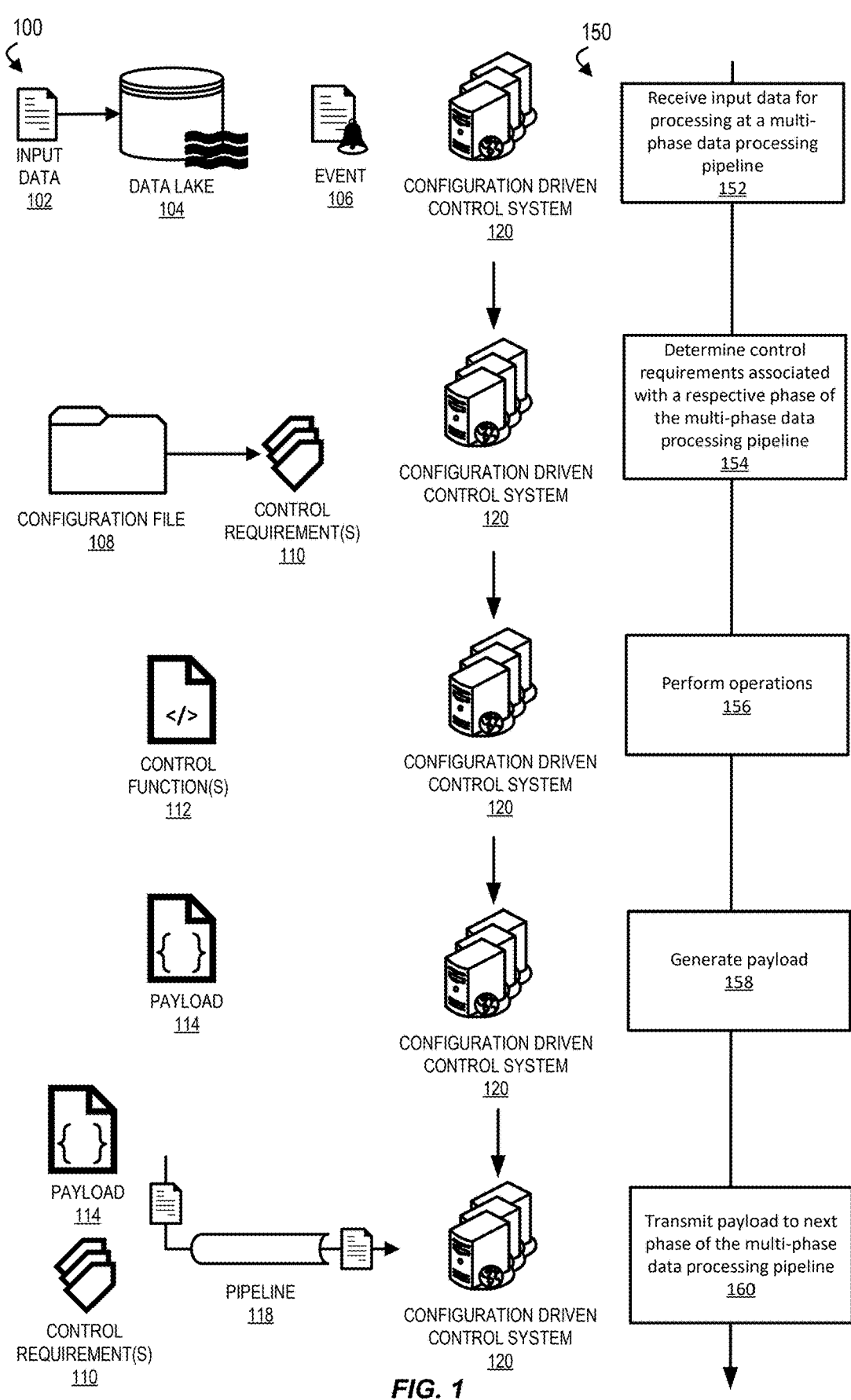
FIG. 1 is an example flow diagram illustrating an example integrated multi-phase data processing and data control system workflow, in accordance with at least one embodiment.

In the following description, various embodiments will be described. For purposes of explanation, specific configurations, and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

To address challenges associated with processing data through a multi-phase data processing pipeline while maintaining and enforcing data control requirements.

Techniques described in the present disclosure relate to, among other things, methods, systems, devices, and computer-readable storage media for integrated data processing and integrity management across multi-phase data pipelines using configuration-driven control and dynamic validation mechanisms. These techniques enable the orchestration of data ingestion, transformation, validation, enrichment, and distribution in a manner that is adaptable to diverse data sources, formats, operational requirements, and other aspects of data processing and data integrity management. By leveraging a centralized repository of configuration profiles and control requirements, the system can flexibly support complex enterprise data workflows while ensuring consistency and transparency throughout the data lifecycle.

The system can orchestrate the aspects of data processing management such as ingestion, transformation, validation, and distribution of input data through multiple processing phases. Furthermore, the system can dynamically applying configurable control requirements and modular control functions to ensure data quality and compliance. Through the use of metadata extraction and phase-aware configuration selection, the system can determine which integrity checks, business rules, or processing steps are necessary for each stage. Modular control functions may be invoked in parallel or sequence, executing validations such as record count verification, schema enforcement, duplicate detection, and business logic application. The system can also generate structured payloads for each phase, manage intermediate state storage, and facilitate the controlled handoff of data between pipeline stages, supporting reprocessing and selective downstream access as needed.

The techniques described herein may be event driven and leverage metadata-driven configuration as well as stateless and parallelizable control functions. In addition, the techniques may employ centralized repositories for control requirements, control functions, and processing results. Various metadata such as file name, data type, source, schema version, and processing history can be extracted from input data or associated events and used to dynamically select the appropriate configuration profile and set of control requirements for each pipeline phase. Stateless control functions can operate independently on provided inputs, allowing for efficient parallel execution and flexible scaling across cloud, on-premises, or hybrid environments. The event-driven orchestration enables responsive, automated workflow progression.

Techniques described herein also include dynamically selecting phase-specific integrity controls based on input data metadata, executing modular validation and processing operations, generating structured payloads for inter-phase handoff, and providing robust error handling, fault tolerance, logging, and auditing throughout the data lifecycle. For example, upon receipt of new input data, the system may extract metadata, query configuration repositories, and determine which checks or transformations should be applied in the current phase. Modular control functions may be invoked to perform these operations, returning structured results that are aggregated into payloads alongside the processed data and metadata. Payloads may be transmitted to subsequent phases or stored for future retrieval, supporting traceability and operational flexibility. The system can maintain detailed logs and error reports at each phase, enabling end-to-end traceability to meet compliance requirements.

The techniques described herein can overcome the limitations of conventional, tightly coupled, or ad hoc data processing approaches by enabling scalable, flexible, and maintainable enforcement of data integrity and processing standards, rapid adaptation to new data types and requirements, and comprehensive traceability across diverse computing environments. Unlike traditional systems that require per-control coding, which results in rigid workflows or manual intervention for each new source or requirement, the disclosed configuration-driven architecture allows new controls, data types, or processing rules to be implemented by updating configuration files and registering new modular control functions. The stateless, event-driven implementation can provide entities with a scalable and efficient integrated data processing and data integrity system spanning cloud, on-premises, and/or hybrid infrastructures.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

I. Overview

Entities, especially those operating at large scale, often process substantial volumes of data originating from various sub-entities. Incoming data may arrive in raw, unstructured, or otherwise nonstandard formats that are not immediately usable by end users such as developers, analysts, customers, or stakeholders. The data may also be delivered in different formats, schemas, encodings, and other variations, which can further complicate ingestion and transformation for downstream utilization. As a result, multiple processes may need to be executed after data arrival to transform the data into a format that is valuable to the end user. These processes may occur sequentially in a multi-phase data processing system, enabling operations such as validation of record counts, detection of duplicates, verification of checksums, enforcement of schema consistency, and confirmation of required fields or value constraints. Failure to apply appropriate checks at each phase can result in the propagation of errors or data loss, thereby compromising the value of the data. Throughout these processing phases, it can be important to maintain data integrity so that end users can be assured of the quality and completeness of the resulting data.

One such advantage of the techniques disclosed relates to error handling and incident management. Multi-phase data processing pipelines often manage large volumes of heterogeneous data for analytics and operational purposes. Certain pipeline architectures may implement error handling and incident management as a collection of ad hoc or fragmented routines, if such mechanisms are present at all. This fragmented approach can result in technical deficiencies that undermine both reliability and operational effectiveness. For example, data validation and control failures, such as schema mismatches, missing required fields, or exceeded tolerance thresholds, may go unnoticed or unreported, especially when error handling logic is dispersed across various pipeline phases or deeply embedded in application code. In this context, errors or control failures that are not detected and addressed at the appropriate stage of processing can propagate to subsequent phases or downstream consumers, which may amplify their impact and complicate remediation efforts.

When data quality or integrity issues are eventually discovered, the lack of systematic traceability and notification mechanisms can impede root cause analysis. Incident management in these environments can often become manual and/or resource-intensive, relying on informal communication and time-consuming investigation. Pipelines that lack robust error handling can also exhibit limited fault tolerance and recovery capabilities, such that a single unhandled error may necessitate a full pipeline restart, potentially resulting in data loss or duplication of effort. The system may also require down time to reboot or restart the data ingestion process is restarted. Moreover, regulatory and business requirements may call for comprehensive audit and reporting logs to ensure timely notification of failures, but legacy approaches may struggle to meet these standards, thereby exposing organizations to compliance risk. These challenges can increase operational costs and slow incident resolution, which can ultimately undermine the overall integrity and value of enterprise data.

The present disclosure introduces a technical solution to these problems through an integrated, configuration-driven controls framework that supports automated error handling and incident management throughout the multi-phase data processing pipeline. In this framework, error detection can be managed centrally, rather than being left to scattered, phase-specific routines. Control requirements such as tolerance thresholds and error conditions may be defined in a centralized repository and dynamically retrieved for each pipeline phase and data type. Modular and parameterized control functions help to ensure that relevant checks are applied consistently and systematically across the pipeline. After executing the relevant control functions, the system can automatically evaluate results against predefined criteria and tolerance thresholds. This evaluation can distinguish between minor discrepancies, such as a small percentage of missing values, and critical failures, such as a schema mismatch or an exceeded error threshold. The framework may support flexible, context-aware error handling by allowing for different responses depending on the severity and nature of the issue. Upon detecting that a control result exceeds a tolerance threshold or that a critical failure has occurred, the system can generate a structured incident notification. These notifications may be routed in real time to designated systems or personnel, for example via API, message bus, incident management platform, or dashboard, so that responsible parties are promptly informed and can take corrective action. In cases where the system encounters an unrecognized data type or missing control requirements, it can similarly generate and dispatch notifications, thereby preventing unconfigured data from advancing through the pipeline undetected.

The framework also supports comprehensive logging, auditability, and traceability. Each execution of a control function, along with its results and any error conditions, may be logged with full context, including input data identifiers, pipeline phase, configuration parameters, observed metrics, and timestamps. These logs and incident notifications can be stored in dedicated repositories, supporting both real-time monitoring and historical audit as well as facilitating root cause analysis. Each phase's output, including both processed data and control results, may be preserved, which enables rollback to the last known good state and facilitates selective reprocessing or recovery as needed.

The system can implement configurable policies for error responses. If a critical failure or out-of-tolerance condition is detected, the framework may automatically abort further processing of the affected payload, thereby shielding downstream consumers from bad data. Alternatively, for non-critical discrepancies, the system may allow processing to continue while flagging the issue for later review. The architecture is designed to be scalable and fault-tolerant, relying on stateless, parallelizable control functions and event-driven orchestration. These design choices enable the error handling and incident management processes to scale with data volume and pipeline complexity, which minimizes the risk that unhandled errors will disrupt the entire pipeline.

Another such solution provided by the disclosed relates to accurately applying the correct integrity controls and validation checks at each stage of a pipeline to improve operational efficiency. Certain approaches to control selection are typically characterized by static configuration and hard-coded logic, whereby the specific controls to be enforced at each pipeline phase are predefined within application code or distributed configuration files. Such static approaches can become unwieldy and error-prone as the number and diversity of data types, sources, and processing requirements increase. For example, each time a new data format is introduced or an existing control requirement changes, significant manual intervention may be required to update code, redeploy components, or synchronize configurations across systems. This inflexibility can lead to either over-application of controls, where unnecessary validations are performed on irrelevant data, or under-application, where required checks are omitted for certain data types or pipeline phases. As a result, data pipelines may experience performance inefficiencies.

The disclosed techniques relate to configuration-driven dynamic control selection. These techniques can enable the selection and application of control requirements at each pipeline phase be governed by metadata that is extracted from the input data itself or from associated events as the data enters the pipeline. Upon receiving new input data, the system can automatically extract or receive this metadata and use it as the basis for querying a centralized configuration repository. The configuration repository can encode the relationships between data attributes, pipeline phases, and the set of applicable control requirements, allowing the system to dynamically determine which validations or processing steps are relevant for the current context.

By leveraging metadata- and configuration-driven control selection, the system can ensure that only the controls that are appropriate for the specific data type, source, and processing phase are applied. For example, if the metadata indicates that the input data originates from a trusted internal source, the system may bypass certain security-related checks that are reserved for external or untrusted data. Conversely, if the metadata reveals that the data is of a newly introduced format or schema version, the system may apply a more comprehensive set of validations or invoke specific control functions tailored to the new requirements. This approach can reduce unnecessary computation and latency by avoiding redundant or irrelevant checks, thereby improving the efficiency of the pipeline. Furthermore, it can support rapid adaptation to new data types, sources, or compliance mandates, as updates to control logic can be made centrally in the configuration repository rather than requiring code changes or redeployment.

The resource efficiency of this solution may be further enhanced by its ability to minimize wasted compute cycles and optimize the allocation of processing power. Because the system applies only those controls that are determined to be necessary by the metadata and configuration logic, it can avoid expending resources on validations or transformations that do not pertain to the current data set or processing phase. For instance, when processing high-volume data streams in cloud or hybrid environments, the system can parallelize only the relevant control functions and thereby reduce the overall processing time and preventing bottlenecks that might otherwise arise from blanket or serial execution of all available checks. As a result, system throughput may be improved, memory and CPU utilization may be optimized, and operational costs associated with data processing infrastructure may be reduced.

The framework may also support conditional and phase-aware control selection. As data progresses through the various phases of the pipeline, metadata reflecting the current processing state, prior validation results, or the history of applied transformations can be updated and propagated alongside the data. Each pipeline phase can use the most current metadata to determine, in real time, which control requirements remain applicable or need to be modified. This enables the pipeline to apply the correct sequence of checks and transformations at each stage, supporting both sequential and parallel validation models.

The use of metadata-driven dynamic control selection can also facilitate scalable and modular implementation. Control functions can be designed to accept configuration parameters and metadata as inputs, allowing them to be reused across multiple phases and data types without modification. This modularity reduces maintenance overhead, which can enablee the pipeline to scale efficiently across cloud, on-premises, or hybrid computing environments.

Additionally, because these entities often maintain diverse computing ecosystems, they frequently handle data of various types, which can necessitate increased operational overhead to accommodate the differing data formats and requirements from end users. The absence of a unified, configuration-driven approach to both data processing and data integrity management can lead to redundant or increasingly complex implementations. This, in turn, increases the burden on the entity's computing resources and heightens the risk of undetected data quality issues. Furthermore, these factors can impede scalability and limit the portability of data processing and integrity management solutions across different platforms and environments. Complex implementations may also increase the risk of system disruption, as they are not easily updated or managed. The disclosed multi-phase data processing and integrity control system addresses these challenges by employing event-driven and configuration-driven techniques that facilitate flexible management of data processing and integrity controls across phases.

FIG. 1 is an example flow diagram illustrating an example integrated multi-phase data processing and data control system 100, in accordance with at least one embodiment. FIG. 1 includes an integrated multi-phase data processing and data control system 100 (hereinafter also referred to as "system 100") showing an example process 150 for, amongst other things, aspects of processing data according to applicable control requirements. System 100 may comprise input data 102, data lake 104, event 106, configuration file 108, control requirements 110, control function 112, payload 114, pipeline 118, and configuration driven control system 120.

Configuration driven control system 120 can be implemented to orchestrate and manage data processing and data integrity controls across multi-phase data pipelines. Configuration driven control system 120 may be modular and comprise some or all of the components described above. In addition to or alternatively, configuration driven control system 120 may be configured to couple with some or all of the components described above. Depending on the computing architecture and/or other considerations, configuration driven control system 120 may be implemented in a cloud environment (e.g., Amazon S3, Azure Blob Storage, Google Cloud, etc.), on premises, or with a hybrid computing environment.

Process 150 may begin at block 152, with configuration driven control system 120 receiving input data 102 for ingestion into data lake 104. Input data 102 may be received directly from an originating source and/or from a preceding phase of the pipeline that has processed input data 102 in preparation for its ingestion into data lake 104. In some embodiments, event 106 associated with input data 102 is transmitted to configuration driven control system 120 to indicate the arrival of input data 102. Event 106 may be an event notification or trigger that initiates operation of configuration driven control system 120 by indicating that input data 102 is available for processing into data lake 104. Event 106 can be triggered by a wide range of activities or system changes depending on the architecture and requirements of the entity. For example, event 106 may be generated in response to input data 102 being uploaded to a storage location such as a landing zone within data lake 104. As another example, event 106 may be generated when a batch of records is inserted into a staging table or when an API endpoint receives new data from an external source. Messages published to queues or buses (e.g., AWS SQS, Apache Kafka, etc.) may also be forms of event 106. In addition to or alternatively, event 106 may be webhooks or callbacks from upstream systems. Event 106 can contain metadata about input data 102, such as its location, type, source identifier, relevant timestamps, and the like.

Input data 102 can be any data that is intended to be processed by configuration driven control system 120. Input data 102 may be received directly from an originating source and/or from a preceding phase of the pipeline that has processed input data 102 in preparation for its ingestion into data lake 104. When input data 102 originates from a source, input data 102 may originate from a wide range of sources and can take various forms, including files, database records, structured messages, API submissions, or data streams. In some embodiments, input data 102 may be supplied by internal systems, such as transactional databases, application logs, or monitoring feeds, or it may be received from external sources such as vendors, clients, or other third-party platforms. Input data 102 may arrive as raw, unstructured content (e.g., plain text, log files, etc.) or as semi-structured or structured data (e.g., CSV files, JSON, XML, relational database tables, etc.). If input data 102 is received from a previous phase of the pipeline, input data 102 may be an intermediate or partially processed version of the original input data 102. It may have already undergone specific validation checks, transformations, normalization, enrichment, or formatting operations dictated by the requirements of earlier pipeline stages, as will be described in more detailed below. Input data 102 received from a previous phase may be accompanied by metadata indicating which control requirements were applied, the results of those checks, any modifications made, and/or other information relevant to subsequent processing.

Transmission of input data 102 to configuration driven control system 120 can occur through various mechanisms. Input data 102 can delivered to a designated storage location, such as a cloud object store (e.g., Amazon S3, Azure Blob Storage, Google Cloud, etc.) or an on-premises storage system. Input data 102 may be uploaded manually by users, programmatically by applications, or transferred via secure file transfer protocols (e.g., SFTP, FTPS, SCP, etc.). In environments with real-time or near-real-time requirements, input data 102 may arrive as messages on a queue or event bus (e.g., Apache Kafka, RabbitMQ, AWS SQS, Google Pub/Sub, etc.). In these cases, input data 102 can be delivered as part of the message body, or as a reference to a file or record to be retrieved. Additionally or alternatively, input data 102 may be transmitted through API calls, where external systems can invoke a RESTful or GraphQL endpoint exposed by configuration driven control system 120 and submit input data 102 directly as part of the request payload.

Data lake 104 may serve as a central repository for storing input data 102 and related artifacts such as metadata, control files, configuration data, governance logs, etc. in addition to input data 102. Data lake 104 can be implemented using cloud-based object storage services (e.g., Amazon S3, Azure Blob Storage, Google Cloud Storage, etc.), distributed file systems, on-premises storage arrays, and the like. Other implementations, such as Hadoop Distributed File System (HDFS), network-attached storage (NAS), may also be utilized to implement data lake 104. Data lake 104 implemented using hybrid architectures may synchronize data across cloud and on-premises data lakes. Data lake 104 may also manage the phases of the multi-phase data processing pipeline, which will be described in further detail below.

Input data 102 may first be received in its original form at a designated partition of data lake 104, such as during the initial phase of a multi-phase data processing pipeline (for example, a landing or raw zone). Configuration driven control system 120 may process metadata associated with input data 102, retrieving this metadata directly from input data 102 or, if event 106 is utilized, extracting it from event 106 itself. If input data 102 is received from an intermediate phase within the multi-phase data processing pipeline, it may arrive in a modified form along with metadata that records which data control requirements were checked in the previous phase and the results of those checks. Configuration driven control system 120 can extract and utilize metadata such as file name, source system, creation timestamp, schema version, file type, record count, checksum value, pipeline phase, user or system ID, data size, frequency indicator, and destination information. This metadata can inform validation, transformation, routing, and governance decisions throughout the multi-phase data processing pipeline. Metadata may be obtained by configuration driven control system 120 directly from input data 102, included in event 106, or supplied by upstream systems.

At block 154, configuration driven control system 120 may determine control requirements associated with the respective phase of the multi-phase data processing pipeline. Configuration file 108 can be a central repository and may be implemented as a structured file (e.g., JSON, YAML, XML, etc.) or as a configuration database that stores control requirements 110. In some embodiments, configuration file 108 can store control requirements 110 organized by phase of the multi-phase data processing pipeline, which will be described in greater detail below. Control requirements 110 may include, but are not limited to, record count verification, duplicate record detection, empty file detection, schema validation, checksum/hash verification, and the enforcement of required fields or value constraints. Each control requirement 110 may be parameterized by attributes such as tolerance thresholds, schema expectations, required columns, or validation logic, allowing for tailored integrity checks that reflect the operational needs of different data sources and business rules.

Configuration file 108 may be stored in a cloud-based configuration service or a local configuration database, depending on the deployment environment. Configuration driven control system 120 may access configuration file 108 via API calls, direct database queries, or file system lookups. Updates to control requirements 110, such as the introduction of new control requirements, adjustment of tolerance parameters, or changes in required schema, can be made centrally in configuration file 108.

Configuration driven control system 120 can use relevant metadata associated with input data 102 to retrieve the appropriate control requirements 110. Metadata, such as data type, may indicate that only a subset of the total control requirements 110 is relevant for a given processing context. For example, if the metadata (e.g., data type) indicates that input data 102 was received from an internal source, configuration driven control system 120 may query configuration file 108 with the data type, and configuration file 108 may return a subset of control requirements 110 that excludes, for instance, checks for malicious data, since data originating from internal sources may be considered free of malicious content. Additionally, or alternatively, configuration driven control system 120 may retrieve control requirements 110 based on the current pipeline phase indicated by the metadata. This phase-aware retrieval enables configuration driven control system 120 to apply only those controls that are appropriate for the current stage of processing, thereby improving efficiency and resource allocation. Control requirements 110 retrieved by configuration driven control system 120 can specify not only which data integrity checks to perform, but also which data processing operations may be necessary before input data 102 is advanced to the next phase or made available for downstream use.

At block 156, configuration-driven control system 120 may perform a set of operations, including execution of control functions 112. These control functions 112 may be modular, invocable components that implement the logic for individual control requirements 110. Depending on the computing environment, control functions 112 may be implemented as serverless functions (e.g., AWS Lambda, Azure Functions), workflow tasks (e.g., AWS Step Functions, Apache Airflow operators), containerized microservices (e.g., Kubernetes jobs), application modules or scripts, or RESTful APIs. Each control function 112 can be configured to execute a specific validation or transformation, such as record count verification, duplicate detection, schema validation, checksum comparison, or enforcement of business rules, based on the parameters and logic defined in the retrieved control requirements 110.

Control functions 112 are state agnostic, meaning they do not retain persistent internal state between executions. Rather, each control function 112 can operate solely on input data 102, along with any relevant metadata and configuration parameters provided at the time of invocation. By consuming these inputs, control function 112 can perform its assigned task without requiring session or historical context. Upon completion, each control function 112 may return a result that indicates whether the corresponding control requirement 110 has been satisfied. This result may include a status indicator (e.g., pass, fail, within tolerance, etc.), observed measurements (e.g., record count), the parameters applied, and any additional information. In some embodiments, the result from control function 112 (i.e., control requirements results) can trigger an error message or alert if a control requirement is not met. In addition to, or as an alternative to, performing data integrity checks, control function 112 may also execute data processing operations on input data 102 to prepare it for advancement to the next phase of the pipeline and/or for subsequent downstream use. These data processing operations can include tasks such as data transformation, normalization, enrichment, aggregation, formatting, or schema mapping, depending on control requirements 110 defined in configuration file 108 and/or the current stage of the pipeline. For example, control function 112 may convert unstructured data into a structured format, standardize field names and data types, apply business logic to derive new attributes, or aggregate records based on specified criteria.

The specific set of control functions 112 to be executed may be determined by control requirements 110 gathered in block 154 and/or by metadata associated with input data 102. Configuration driven control system 120 may use this information to identify which control functions 112 are necessary to carry out the required validation and processing tasks for each phase of the pipeline. Because they are state agnostic, control functions 112 may be executed in parallel or in sequence, depending on factors such as the processing logic and resource allocation needs. The stateless design of control functions 112 can also contribute to modularity, scalability of the overall integrated multi-phase data processing and data control system 100.

In some embodiments, control functions 112 may write modified input data 102 to a designated partition within data lake 104 after processing. This is to preserve the intermediate form of input data 102 at each phase, enabling subsequent pipeline stages to refer back to earlier versions if needed. For example, if a processing error occurs, input data 102 can be retrieved from the partition within data lake 104 that corresponds to an earlier phase in the pipeline. This approach allows the configuration driven control system 120 to resume processing from the most recent successful phase rather than restarting from the beginning, thereby saving time and computational resources by reusing an intermediate version of input data 102. Additionally, downstream tasks or entities may require access to a specific intermediate version of input data 102, rather than its final transformed form. By saving input data 102 at each phase following execution of control functions 112, the configuration driven control system 120 can support flexible reprocessing and selective retrieval for various operational and analytical needs.

At block 158, configuration driven control system 120 may generate payload 114 after completing execution of control functions 112. Payload 114 may include some or all of the following: input data 102 (which may be modified as a result of executing control functions 112), relevant metadata, the applicable control requirements 110, and the corresponding results produced by control functions 112.

Payload 114 may be constructed as a structured object, such as a JSON document, an XML file, a database record, or in other suitable formats, depending on the requirements of the processing pipeline and the intended downstream use. The format and content of payload 114 may be dictated by control requirements 110, which can define the required fields, structure, format, and the like for each pipeline phase or target end user.

At block 160, configuration driven control system 120 may transmit payload 114 to the next phase of the multi-phase data processing pipeline for further processing, following the techniques described in process 150. Payload 114 may be transmitted together with the applicable control requirements 110, a log or summary of the control requirement results, and/or any other relevant information or metadata needed for the subsequent phase or downstream operations. In some embodiments, if there is no subsequent phase in the pipeline, configuration-driven control system 120 may store the current form of input data 102 in data lake 104 for archival, audit, or future retrieval purposes. Additionally, or alternatively, the configuration driven control system 120 may send a notification along with payload 114 to inform the relevant entity or user about the current processing status. This notification may include details such as whether control requirements 110 were successfully satisfied, any failures or exceptions encountered during processing, or an indication that input data 102 is now ready for consumption by an end user or downstream system.

It should be understood that the processes described in process 150 may be implemented using a variety of hardware and software platforms and are not limited to those described in above, and may be adapted to accommodate new technologies, such as computing resource types and/or computing environment types as they emerge.

II. Data Control and Multi-Phase Data Processing

The following sections provide detailed descriptions of both the data control system and the multi-phase data processing pipeline within the integrated multi-phase data processing and data control system 100. This integrated architecture can enable flexible and scalable management of data processing and data integrity assurance as data progresses through multiple pipeline phases.

Figure 2:
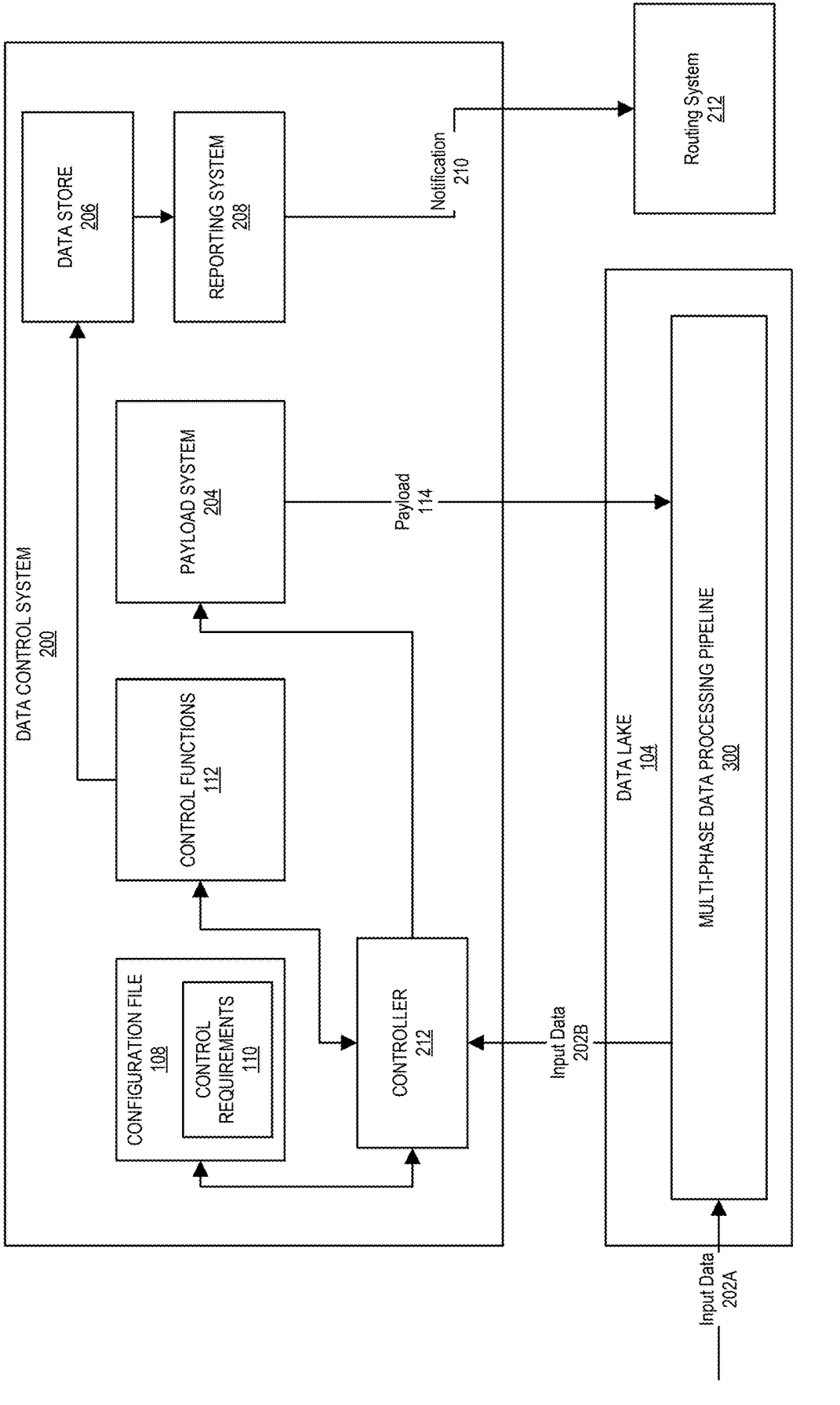
FIG. 2 is a diagram illustrating a data control system, in accordance with at least one embodiment.

FIG. 2 is a diagram illustrating a data control system 200, in accordance with at least one embodiment. Data control system 200 provides more details of the various components and/or operations that may be associated with some or all of the blocks (e.g., blocks 152-160) of process 150. Data control system 200 may comprise configuration file 108, control requirements 110, control functions 112, payload system 204, data store 206, reporting system 208, and controller 212. Data control system 200 may be communicatively coupled with data lake 104. Data lake 104 may comprise multi-phase data processing pipeline 300 (hereinafter also referred to as "pipeline 300"), which will be described in greater detail below. Data control system 200 may receive input data 202B as input, where input data 202B represents input data 202A after it has been pre-processed by pipeline 300, as will be described in greater detail below. Data control system 200 may output data such as payload 114 and/or notification 210.

Configuration file 108 may further comprise control requirements 110. As described above, configuration file 108 may serve as a centralized repository of control requirements 110. Configuration file 108 may be implemented as a JSON, YAML, or XML document, or as a set of records in a configuration database, and can be organized to define phase-specific requirements, parameter settings, conditional activation rules, tolerance thresholds, and the like. Configuration file 108 can be accessed programmatically by data control system 200 and enable dynamic retrieval of control requirements 110 based on input data 202B, metadata, pipeline phase, data source, or other operational context.

As described above, control requirements 110 may be configurable specifications that define the data integrity checks and processing operations to be applied to input data 202B (e.g., input data 102 in FIG. 1) as it moves through each phase of the multi-phase data processing pipeline. Control requirements can be encoded as structured entries or records that specify the integrity checks, validation rules, processing operations, and the like to be applied to input data 202B. These requirements may include validations such as, but not limited to, record count verification, duplicate detection, schema validation, checksum comparison, and enforcement of business rules. Control requirements 110 may be stored in configuration file 108 and can be dynamically retrieved by data control system 200 based on metadata associated with input data 202B and the current pipeline phase.

Controller 212 may serve as an orchestration component within data control system 200, responsible for managing the flow and processing of input data 202B. Controller 212 can manage, receive, transmit, and facilitate the execution of processing and validation operations on input data 202B as it progresses through data control system 200. In some embodiments, controller 212 may receive input data 202B, which represents input data 202A after undergoing pre-processing by pipeline 300. Input data 202B may be accompanied by metadata or other contextual information, such as file name, source system, schema version, processing history, control requirements results from previous phases, or pipeline phase indicators. Controller 212 can use this metadata when querying configuration file 108 to dynamically retrieve relevant control requirements and determine which integrity checks or processing operations should be applied to input data 202B in the current context. Additionally, controller 212 may coordinate the invocation of modular control functions, route data to appropriate storage partitions or processing modules, and manage the sequencing of operations based on input data 202B and/or data related to a respective phase of pipeline 300, as will be described below.

Configuration file 108 may return, in response to a query from controller 212, the control requirements 110. As described above, a query to configuration file 108 by controller 212 may return none, some, or all control requirements 110 associated with input data 202B or to the specific phase of processing. The set of control requirements 110 retrieved may depend on a variety of factors, including the metadata associated with input data 202B (e.g., data type, source, schema version, pipeline phase, etc.), the current operational context (e.g., phase), and the configuration logic encoded within configuration file 108. For example, if the metadata associated with input data 202B indicates that the data contains sensitive information such as payment details, the query to configuration file 108 may include this metadata as part of its context. In response, the retrieved control requirements 110 may specify that input data 202B must only be transmitted to verified and whitelisted endpoints, and may further require that input data 202B be encrypted prior to advancing to the next pipeline phase or being stored for downstream processes. Additionally, control requirements 110 may include further integrity or compliance checks tailored specifically for sensitive data, ensuring that all relevant processing and security measures are enforced before input data 202B is made available for subsequent use. As another example, if only certain validations are required at a particular phase, configuration file 108 may return a targeted subset of control requirements 110, such as only those checks pertinent to the data's format for that particular phase. In scenarios where comprehensive validation is needed, the query may return all relevant control requirements 110, ensuring that each specified integrity check and processing operation is performed before input data 202B advances to subsequent stages of the pipeline or is made available for downstream use.

If controller 212 determines that input data 202B corresponds to a newly encountered data type or requires processing at a phase for which no control requirements 110 have been defined, the query to configuration file 108 may yield no applicable control requirements. In response, data control system 200 may invoke a designated control function 112 to generate an incident report or summary, which is recorded in data store 206 for governance and auditing purposes. The creation of this report can then trigger reporting system 208 to issue notification 210, which is transmitted to a routing system 214 or other operational endpoint to ensure that the appropriate entity (e.g., data governance team, system administrator, business owner, application owner, etc.) is alerted to the presence of an unconfigured or unrecognized input data. Additionally, or alternatively, controller 212 may invoke predefined control functions 112 that apply a set of default controls as a fallback measure. These default controls may include baseline integrity checks, format validations, or security scans, providing a minimum level of protection and oversight until specific control requirements are configured for the new data type or processing phase.

Once control requirements 110 have been determined, controller 212 may communicate control requirements 110 to control functions 112. As described above, control functions may be implemented as serverless functions (such as AWS Lambda or Azure Functions), workflow tasks (such as AWS Step Functions or Apache Airflow operators), containerized microservices (such as Kubernetes jobs), application modules or scripts, RESTful APIs, or other suitable components. Each control function 112 may be designed to execute specific logic and perform operations associated with its respective control requirement of control requirements 110, enabling data control system 200 to enforce data integrity checks and processing tasks throughout the multi-phase pipeline. Control functions 112 can be stateless and operate independently on provided input data 202B, metadata, and/or configuration parameters without retaining persistent internal state between executions. Data control system 200 may therefore invoke multiple control functions 112 in parallel, enabling concurrent processing of integrity checks and data transformations within or across pipeline phases, which can improve efficient resource utilization and reduce latency. In addition, this may positively impact scalable handling of large or complex data workloads.

Control functions 112 may be reusable across multiple phases of pipeline 300 given its stateless architecture. For example, the same schema validation or record count verification control function may be invoked at both a first phase and an intermediate phase of pipeline 300, but with different configuration parameters or schemas appropriate to each phase. In addition, control functions 112 can support versioning, allowing new control functions or updates to be introduced without disrupting existing operations. When an update to one or more control functions 112 is made, the new version of the control function can be registered within data control system 200 while retaining earlier versions. This enables the system to reference and invoke specific control function versions as needed for different phases, data types, or operational contexts, and supports incremental rollouts, compatibility management, and auditability across pipeline executions. Configuration file 108 may reference a specific version for each control requirement 110, enabling the data control system 200 to select and invoke the appropriate control function 112 version based on the operational context. Versioning control functions 112 can facilitate controlled rollouts and easy rollback to prior versions if needed.

Control functions 112 may be configured to perform not only binary pass/fail type checks, but also validations that assess whether specific metrics or data values fall within a defined range or tolerance threshold. For example, rather than requiring an exact match between the observed record count and the expected record count, control function 112 may compare these values and determine whether any difference remains within an allowable variance, such as an absolute or percentage threshold specified by control requirements 110 and/or configuration file 108. Similarly, control function 112 may validate aggregated values (e.g., checksums) by confirming that they do not exceed or deviate from reference values beyond a predetermined tolerance. This approach can allowing data control system discretion to account for minor discrepancies or operational nuances without unnecessarily halting processing or triggering alerts. Tolerance thresholds may be parameterized per control, data type, pipeline phase, and/or other appropriate means and the results of such range-based checks can be recorded with status indicators such as "within tolerance," "exceeds threshold," or "out of bounds," along with the actual values observed and the parameters applied.

The results of control functions 112 (i.e., control requirements results) can be logged in data store 206 and stored for further retrieval and/or analysis. Each invocation of control function 112 may produce a log entry capturing input parameters, execution context, relevant pipeline phase, output status, observed metrics, data snapshots, etc. All errors, failures, and exceptions can be logged with diagnostic information, thereby supporting root cause analysis and governance requirements. For regulatory or audit purposes, the system may maintain records capturing which control requirements 110 were determined, the version used, origin and staleness of input data 202B, and/or other appropriate data. For example, if a duplicate detection control function identifies issues, it may record the input file name, relevant configuration parameters, the number of duplicates detected, and the result status in system logs. An entity, such as a system administrator, can use these logs to reconstruct and trace the processing history of the affected data file by reviewing the recorded system logs.

Data store 206 may be a designated repository for storing the results produced by control functions 112 as input data 202B progresses through the system. Data store 206 can be implemented as a partition or zone within a data lake (e.g., data lake 104 of FIG. 1), a relational or NoSQL database, or a dedicated log management platform, depending on the architecture and operational requirements. Data store 206 may retain structured records for each control function 112 invocation, capturing details such as input data identifiers, processing phase, configuration parameters applied, control requirements results (including status indicators and observed metrics), timestamps, and any diagnostic messages or error reports generated during execution.

To facilitate monitoring and data transparency, data store 206 may also transmit logs or reports to reporting system 208 using one or more mechanisms. For example, data store 206 may publish messages to a queue or event bus (e.g., AWS SQS, Kafka, etc.), invoke a webhook or API endpoint exposed by reporting system 208, or trigger scheduled batch jobs that push log data at defined intervals.

Upon receiving logs or reports from data store 206, reporting system 208 may process the incoming data using rule-based logic and/or other relevant techniques. Reporting system 208 may parse each record to extract attributes related to input data 202B such as the data identifier, control function name, phase of processing, status indicator, and/or any error indicators. For non-binary control requirements results, reporting system 208 can compare observed metrics (e.g., record counts, checksums, duplicate counts, etc.) against predetermined thresholds or historical baselines to identify anomalies and/or deviations. For example, if a control requirement result indicates a status of "fail,"

"exceeds tolerance," or "schema mismatch," reporting system 208 may flag the corresponding data file or pipeline event for further review.

In addition to direct failure detection, reporting system 208 may aggregate control requirements results over time to correlate related incidents across multiple pipeline phases. In addition to, or alternatively, reporting system 208 may utilize machine learning models to identify patterns that signal potential data quality issues or operational risks. If, for example, reporting system 208 detects one or more control requirement failures, instances where predetermined control requirement thresholds have been exceeded or not met, or a critical control requirement has not been satisfied, reporting system 208 may generate notification 210 in response. Notification 210 may include detailed context, such as the affected input data identifier, the nature of the failure or anomaly, relevant configuration and parameter information, timestamps, and references to the specific control requirements results involved.

Notification 210 may be dispatched to routing system 212 and may comprise information associated with input data 202B, configuration requirements 110, control functions 112, and/or the relevant phrase of pipeline 300. In some embodiments, notification 210 may be transmitted to a governance dashboard, incident management platform (e.g., ServiceNow), and/or directly to responsible entities (e.g., system administrators). Notification 210 may be transmitted via email, SMS, API call, or integrated messaging platform.

Routing system 212 may, in response to receiving notification 210, determine the appropriate workflow based on the nature and severity of the detected issue. For example, routing system 212 may reference predefined rules or decision matrices to identify whether notification 210 should trigger an automated remediation process or whether it necessitates escalation. Routing system 212 can also log notification 210 and may integrate with ticketing or incident management platforms to report out the incident associated with notification 210.

After controller 212 determines all operations from control functions 112 has been completed, controller 212 may then transmit input data 202B, the results from control functions 112 (i.e., control requirements results), and/or other relevant metadata to payload system 204. Payload system 204 may be a component that can determine the relevant information to package and transmit to data lake 104, a subsequent phase in pipeline 300, or to repository if there is no more subsequent phase of pipeline 300.

Payload system 204 can then use the information received to generate payload 114. Payload system 204 may be a dedicated component or service within data control system 200 and may be responsible for structuring and preparing the control requirements results received from control functions 112 via controller 212. Payload system 204 may organize this information into a structured format (e.g., JSON, XML, database entry, etc.) depending on the requirements of pipeline 300 and/or downstream processes. In addition to the results of control functions 112, payload system 204 may include the current version of input data 202B (which may have been modified during processing by control functions 112), metadata, and control requirements 110 applied to generate payload 114.

As described above, payload 114 may be transmitted to the next phase of pipeline 300 using mechanisms such as direct writes to a designated partition in data lake 104, publication to a message queue or event bus, or invocation of an API endpoint exposed by pipeline 300. For archival or downstream processing, payload system 204 may store payload 114 in a persistent repository, as will be described in greater detail below.

In addition to metadata associated with input data 202B, payload system 204 may further augment payload 114 with phase identifiers, versioning information, error and anomaly indicators, compliance metadata, routing instructions, data quality metrics, and user or system attribution fields. This additional information can enable traceability and transparency.

Payload 114, as described above, can be further processed in a subsequent phase of pipeline 300 or stored in data lake 104. As will be further described in connection with FIG. 3, payload 114 may advance through multiple, distinct phases of pipeline 300, with each phase responsible for executing phase-specific processing and operations tailored to the current context and requirements. Upon reaching the terminus of pipeline 300, additional logic may be applied to determine how payload 114 (i.e., the final form of input data 202B) is stored, routed, or otherwise managed. This may include decisions regarding archival in a designated data store, delivery to downstream systems or end users, or initiation of specialized workflows based on the final results of input data 202B.

Figure 3:
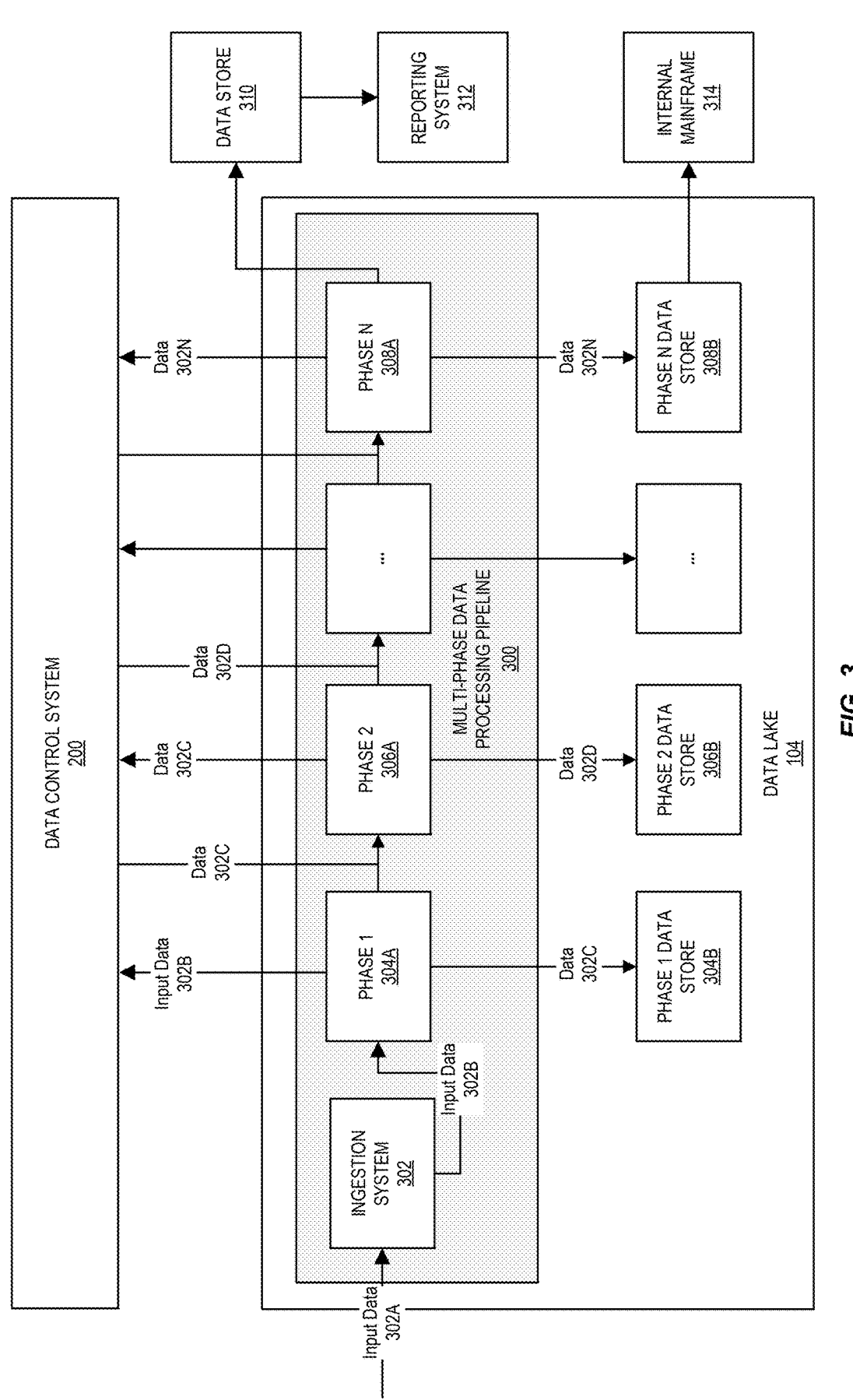
FIG. 3 is a diagram illustrating a multi-phase data processing pipeline, in accordance with at least one embodiment.

FIG. 3 is a diagram illustrating a multi-phase data processing pipeline 300, in accordance with at least one embodiment. Multi-phase data processing pipeline 300 (also referred to as "pipeline 300") may be the processing component of data lake 104 responsible for facilitating input data (e.g., input data 102, input data 202A, and input data 202B) through the phases of pipeline 300. In addition, data lake 104 may be communicatively coupled with data control system 200 via pipeline 300, facilitating the exchange of data and control information between these components. Pipeline 300 may further be communicatively coupled with data control system 200, data store 310, and reporting system 312 to enable coordinated data processing, storage, validation, and reporting operations across the integrated multi-phase data processing and data control system 100 (also referred to as "system 100").

Data lake 104, as described above, may be a centralized repository configured to store large volumes of diverse input data types. It can accommodate raw, semi-structured, and structured data from a variety of internal and external sources. Data lake 104 can support partitioning or zoning, allowing input data (e.g., input data 102, input data 202A, and input data 202B) to be organized by ingestion phase, data type, or other appropriate means. Data lake 104 can support retrieval, transformation, and analysis of stored input data across multiple processing phases, and may be implemented using cloud object storage platforms (e.g., Amazon S3, Azure Blob Storage, Google Cloud Storage, etc.), distributed file systems, or on-premises storage solutions.

Data lake 104 may further include multi-phase data processing pipeline 300, which itself may comprise an ingestion system 302 followed by a sequence of processing phases, such as phase 1 304A, phase 2 306A, through phase N 308A, where N denotes any suitable number of pipeline phases. Corresponding to each processing phase 304A-308A, data lake 104 may also include dedicated storage partitions, such as phase 1 data store 304B, phase 2 data store 306B, and phase N data store 308B, where N represents the number of phases and associated data stores within pipeline 300. Each of these data stores 304B-308B may be used to retain the output or intermediate results produced by its respective phase for purposes such as error recovery or selective processing tasks, as described above.

Each phase (e.g., phases 304A-308A) may represent a discrete, logically defined stage through which input data 302A progresses as it is transformed, validated, and prepared for a subsequent phase and/or downstream use. Phases 304A-308A may each be tailored to perform a specific set of operations according to the requirements of that phase. Input data 302A may flow sequentially from one phase to the next, with the output of each phase 304A-308A serving as the input for a subsequent phase. The functions performed in each phase may vary based on a variety of factors such as the data being ingested, entity requirements and business rules needs, compliance considerations, etc. Example phases of pipeline 300, such as phases 304A through 308A, may include an initial ingestion phase that accepts raw input data from various sources, performs basic validation, and stages the data in a designated area of data lake 104. A raw phase may preserve input data 302A in its original form to support traceability and rollback. Subsequent phases can address cleansing and normalization by standardizing data types and formats and managing duplicates. A curated or transformation phase may enrich, aggregate, and validate input data 302A, performing integrity checks such as schema validation or record count verification. A semantic or business rule phase may apply domain-specific logic while mapping data to relevant models and applying further quality controls. The final outbound or publishing phase may format the data for delivery to downstream consumers and, if required, apply masking or encryption before storing or distributing input data 302A in its final form.

Each phase 304A through 308A may be associated with a unique subset of control requirements 110, determined using techniques described above. As input data 302A advances through pipeline 300, each phase from 304A to 308A may produce an updated payload (e.g., data 302C through data 302N) that reflects the specific processing and validation performed at that particular phase. Each of data 302C through data 302N represents the result of transforming data from the previous phase of phase 1 304A to phase N 308A. As shown in FIG. 3, input data 302B is initially received by phase 1 304A, which transmits this data to data control system 200 for processing, as described above. Data control system 200 returns data 302C, representing the transformed version of input data 302B. Phase 1 304A may store data 302C in phase 1 data store 304B, preserving this intermediate state before passing data 302C on to phase 2 306A. This process is repeated for each subsequent phase, with each phase storing its respective output in a respective dedicated data store and transmitting the transformed data to the next phase, culminating in phase N 308A. This sequential approach ensures traceability, supports error recovery, and allows each phase to build upon the results of prior processing as input data 302A moves through pipeline 300.

Input data 302A (e.g., input data 102, input data 202A, and input data 202B) may require processing before ingestion into data lake 104. Input data 302A may be initially received at ingestion system 302. Ingestion system 302 can act as the entry point for input data 302A, performing initial intake operations including validation and security checks to prepare the data for subsequent processing within pipeline 300. Ingestion system 302 may be configured to accept data from a wide variety of internal and external sources, such as files uploaded to cloud object storage, records transmitted via APIs, streaming data feeds, and/or database extracts. Upon receipt, ingestion system 302 can extract relevant metadata from input data 302A, verify basic format or schema compliance, and figure out where input data 302A should go next.

Ingestion system 302 may also apply initial quality checks, which can include scanning for malicious content if required by organizational policy. Metadata captured by ingestion system 302 may be recorded and associated with input data 302A. This metadata enables downstream phases of pipeline 300 to dynamically select control requirements (e.g., control requirements 110) and control functions (e.g., control functions 112) that are tailored to the specific characteristics of input data 302A. After initial processing, ingestion system 302 may transmit the prepared input data 302A, along with its associated metadata, to the first processing phase of pipeline 300, such as phase 1 304A. Following this initial processing and transmission, input data 302A becomes input data 302B, reflecting its initial pre-processed state as it enters phase 1 304A.

Phase 1 304A may then receive input data 302B, which represents input data 302A after it has been pre-processed and augmented with metadata by ingestion system 302. Phase 1 304A can utilize the associated metadata to determine the appropriate control requirements (e.g., control requirements 110), control functions (e.g., control functions 112), configuration parameters, processing logic, and/or other appropriate operations to be applied as input data 302B advances through this and subsequent phases of pipeline 300. Once control functions (e.g., control functions 112) have been completed, phase 1 304 A may receive a payload (e.g., data 302C) from data control system 200 according to the techniques described above. Phase 1 304 A may then store data 302C to phase 1 data store 304B to preserve this intermediate form of input data 302B. The process described can be repeated for each subsequent phase (e.g., phase 2 306 A through phase N 308A).

In some embodiments, before transmitting the received input data to data control system 200, the respective phase may evaluate the received control requirement results and, based on this evaluation, determine whether to proceed with processing the input data according to the requirements of that phase or to halt further processing if the control requirements results indicate a critical failure or that a specified threshold has not been met. If such a decision to abort is made, data control system 200 may initiate reporting protocols as previously described, ensuring that relevant entities are notified and that appropriate records are created for audit and remediation purposes.

Handoffs between phases may be managed by writing data to the data store (e.g., phase 1 data store 304B through phase N data store 308B) associated with the subsequent phase (e.g., phase 1 304A through phase N 308A), publishing messages to event buses, or calling API endpoints exposed by subsequent stages, as described above.

At the ultimate phase in pipeline 300, depicted as phase N 308A, the final form of input data 302A—denoted as data 302N—may be transmitted to data store 310. Data store 310 may serve as a dedicated repository for storing data output from the conclusion of pipeline 300, ensuring that the processed and validated data is preserved for downstream processes and/or external retrieval by other systems. As depicted in FIG. 3, data store 310 may be implemented as a separate repository independent of data lake 104, enabling entities or downstream consumers without direct access to data lake 104 to retrieve data 302N via data store 310. This allows for controlled and secure access to the final processed data while maintaining the integrity and governance of the internal partitions of data lake 104. By providing data store 310 as an externally accessible repository, the system can facilitate integration with external applications and/or systems that require access data 302N without exposing the broader data lake 104 environment. In some embodiments, data store 310 may be implemented as a partition, zone, or logical directory within data lake 104. In addition to the final processed data 302N, data store 310 may retain other associated artifacts, such as metadata captured or generated throughout one or more phases of pipeline 300, records of configuration requirements applied, results of control function executions, error or anomaly logs, and any lineage or audit information necessary for governance or compliance.

In response to data store 310 receiving and recording data 302N, reporting system 312 may generate an event to notify relevant entities or users that input data 302A has completed all processing phases and that its final form, data 302N, is now ready for access or further action. Reporting system 312 may access the stored metadata and control requirement results associated with data 302N to determine the overall status of the processed data. If any failures or threshold breaches are detected, reporting system 312 may generate and transmit notifications containing detailed context about the issue, including which control requirements were not satisfied and references to affected data 302N.

Data 302N may also be transmitted to phase N data store 308B for storage, which may serve as the final dedicated storage partition within data lake 104 specifically associated with the ultimate phase N 308A of pipeline 300. Data store 302N can retain the final, fully processed and validated version of data 302N. Data store 302N may transmit data 302N to internal mainframe 314 for consumption by the intended target end user.

Internal mainframe 314 may receive the final processed form of input data 302A—denoted as data 302N—after it has completed all phases of pipeline 300. Upon receipt of data 302N, internal mainframe 314 can execute further processing distribution workflows according to organizational requirements and business logic. Data 302N may be transmitted to internal mainframe 314 using, for example, secure protocols (e.g., SFTP, FTPS, MQ messaging, etc.) or through custom API integrations.

Once data 302N is transmitted to internal mainframe 314, it can be available for use by a range of systems, databases, applications, tools, and other components that operate on internal mainframe 314. These systems and applications may provide access to data 302N through dashboards, tables, graphical user interfaces (GUIs), or other presentation mechanisms suited to organizational workflows. Internal mainframe 314 can distribute the received data to various end users or downstream consumers by updating internal databases, generating operational or analytical reports, or initiating further automated workflows. Distribution methods may include granting direct access to authorized internal users, (e.g., terminal interfaces, business intelligence platforms, custom dashboards, etc.), executing scheduled batch exports to other enterprise systems, or securely transferring data to external vendors as required. Additionally, internal mainframe 314 may be integrated with identity and access management solutions to ensure that all data access and distribution activities are strictly controlled for security purposes.

As described in further detail below, integrated multiphase data processing and data control system 100 can handle input data associated with previously unrecognized data types, thereby adapting to evolving data sources and supporting operational resilience as new data types are introduced.

Figure 4:
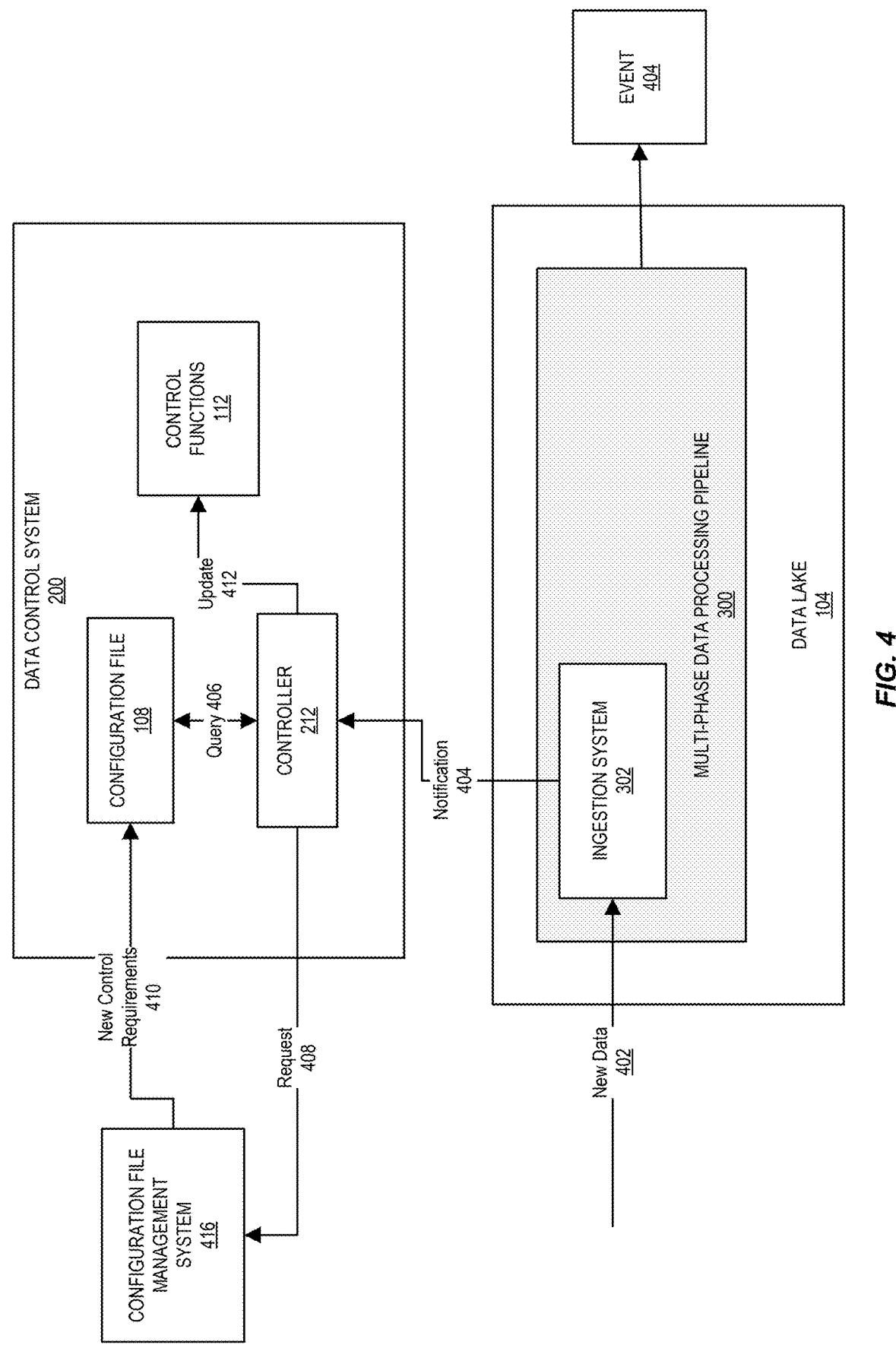
FIG. 4 is a diagram illustrating integrating new data types and control requirements into integrated multi-phase data processing and data control system, in accordance with at least one embodiment.

FIG. 4 is a diagram illustrating integrating new data types and control requirements into integrated multi-phase data processing and data control system 100, in accordance with at least one embodiment. For clarity, only relevant components of system 100 are shown and it should be understood that system 100 as depicted in FIG. 4 may include some or all the components described in FIG. 1-4 and 6-7. In addition, certain components in FIG. 4 have been previously introduced and discussed herein and this FIG. 4 will focus on new elements.

New data 402 may be associated with a previously unrecognized data type and can be received at pipeline 300 via ingestion system 302. Upon receipt, ingestion system 302 may execute pre-processing operations that extract metadata from new data 402 and determine, based on the metadata, that the data type is not currently recognized or configured within the system. Ingestion system 302 may then transmit notification 404 to controller 212, indicating that an unrecognized data type has been received and is pending processing for ingestion into data lake 104. In response to receiving notification 404, controller 212 may transmit query 406 to configuration file 108. Query 406 may serve as a safeguard to confirm that configuration file 108 does not contain control requirements corresponding to new data 402. Additionally, or alternatively, query 406 may include instructions for configuration file 108 to apply a set of default control requirements (if available) and to proceed with processing new data 402 using default control requirements in accordance with the techniques described herein.

If controller 212 determines that no control requirements exist for new data 402 and that default control requirements are not available or not suitable, controller 212 may initiate request 408 to configuration file management system 416. Configuration file management system 416 may be responsible for managing the lifecycle of configuration files, including the intake and fulfillment of requests to add new control requirements or to modify existing ones in response to new data types or operational needs.

In response to request 408, configuration file management system 416 may create and transmit new control requirements 410 tailored to the attributes and operational context of new data 402. In some embodiments, configuration file management system 416 may send one or more requests to an entity (e.g., developer, system administrator, etc.) to request the new control requirements 410. Configuration file 108 can receive new control requirements 410 and store them as structured entries or records, ensuring that the new requirements are available for dynamic retrieval and enforcement during subsequent data processing events involving new data 402.

Once configuration file 108 has been updated to include new control requirements 410, controller 212 may transmit update 412 to control functions 112. Update 412 may register or activate new or modified control functions that implement the logic necessary to satisfy new control requirements 410, enabling the system to process new data 402 in accordance with the newly defined validation, processing, transformation, business logic, and the like. Update 412 ensures that future instances of new data 402 are handled using the appropriate control mechanisms.

Pipeline 300 may transmit event 404 to a targeted end user or administrator to provide status updates regarding the integration of new control requirements 410 with configuration file 108. For example, event 404 can notify the designated end user that new control requirements 410 have been successfully incorporated into configuration file 108, confirming that system 100 is now equipped to process future instances of new data 402. Alternatively, event 404 may serve as an alert indicating that new data 402 was not recognized due to the absence of corresponding control requirements and therefore could not be processed until appropriate requirements have been defined and integrated. This notification may include details such as the data type or source of new data 402, the specific reason for processing suspension, and any actions required by the end user to enable system configuration or approval of new control requirements 410.

III. Methods

FIG. 5 is a block diagram illustrating an example method 500 for integration pattern generation, in accordance with at least one embodiment. A non-transitory computer-readable storage medium may store computer-executable instructions that, when executed by at least one processor, cause at least one computer to perform instructions comprising the operations of the method 500. It should be appreciated that the operations of the method 500 may be performed in any suitable order, not necessarily the order depicted in FIG. 5. Further, the method 500 may include additional, or fewer operations than those depicted in FIG. 5. The operations of method 500 may be performed by any suitable portion of integrated multi-phase data processing and data control system 100 of FIG. 1. In some embodiments, method 500 may be executed by components of computing system 600 of FIG. 6. In some embodiments, method 500 may be executed by components of computing device 700 of FIG. 7.

At 502, a first input data (e.g., input data 102, input data 202A, input data 302A) for processing at a multi-phase data processing pipeline (e.g., pipeline 300) may be received. The first input data may be associated with a first identifier and a first plurality of attributes. The multi-phase data processing pipeline may comprise any number of phases (e.g., phase 1 304A, phase 2 306A, phase N 308A), such as a first phase, a second phase, of N number of phases, where N is greater than 0. The phases of the multi-phase data processing pipeline may be ordered sequentially such that the second phase is an intermediate phase between the first phase and the Nth phase, where the Nth phase is the final i.e., ultimate phase. It should be understood that the operations described in FIG. 5, although presented from the perspective of the first phase, may also be applicable to any subsequent phase, including the second phase through the Nth phase, within a multi-phase data processing pipeline.

At 504, one or more control requirements of a plurality of control requirements (e.g., control requirements 110) associated with a first phase of the multi-phase data processing pipeline may be determined in response to receiving the first identifier. The one or more control requirements may be determined at least in party by the first plurality of attributes.

The control requirements of the plurality of control requirements may comprise at least one of: a duplicate record check, record count verification, empty file detection, schema validation, or checksum verification.

At 506, a function (e.g., control function 112) from a plurality of functions may be determined. The function may be associated with a respective control requirement of the plurality of control requirements determined at block 504.

At 508 the function may be executed to determine a control requirement result. The control requirement result may be associated with a respective attribute of the first plurality of attributes.

At 510, the control requirement result from 508 may be stored. The control requirement result may be stored in a dedicated repository (e.g., data store 206, data store 310).

Blocks 506 through 510 can be applied to each phase of the multi-phase data processing pipeline and some or all operations may be performed for each phase of the multi-phase data processing pipeline (e.g., pipeline 300).

At 512, a set of control requirements results may be generated. The set of control requirements results can be generated based on the control requirement result(s) from 510. The set of control requirements results can be stored in a data store (e.g., data store 206, data store 310).

At 514, the first input data may be modified in response to the set of control requirements results generated at 512. The modification to the first input data can be based at least in part on the set of control a set of control requirements results generated. The first input data may be modified by a data control system (e.g., data control system 200). Data control system may transmit the modified first input data to a subsequent phase (e.g., phase 2 306A, Phase N 308A) of the multi-phase data processing pipeline (e.g., pipeline 300).

At 516, the modified first input data may be stored. The modified first input data (e.g., input data 302B, data 302C-data 302N) can be stored in a respective data store associated with the current phase of the multi-phase data processing pipeline (e.g., phase 1 data store 304B, phase 2 data store 306B, phase N data store 308B). In some embodiments, modified first input data may be stored in a data store separate from the data lake (e.g., data store 310).

At 518, a payload (e.g., payload 114) may be generated. The payload generated may comprise the modified first input data, the set of control requirements results, and the first plurality of attributes. In some embodiments, the payload may be generated with a subset of the respective set of control requirements. The subset of the respective set of control requirements may be determined based on the first plurality of attributes.

An intermediate phase of the multi-phase data processing pipeline, such as the second phase, may receive the payload described at 518. Additionally, any intermediate phase and/or the final phase of the multi-stage data processing pipeline (e.g., phase 2 306A, Phase N 308A), may receive the payload described in 518. The payload received by the second phase (or other intermediate phase or final phase) may comprise the modified data, the set of control requirement results, and the first plurality of attributes. Based on the set of control requirement results, it may be determined that one or more tolerance thresholds has been exceeded. In response to determining that one or more tolerance thresholds has been exceeded, an incident notification may be generated and transmitted. Further processing of the payload may be aborted.

At 520, a second phase may be determined and the payload transmitted to the second phase. The second phase may be determined based at least in part on the first phase. In some embodiments, the second phase may be the final phase of the multi-phase data processing pipeline (e.g., phase N 308A). The final phase may further comprise determining one or more operational requirements associated with a target system (e.g., internal mainframe 314). The target system can be determined based on at least one of the first identifier or the or the first plurality of attributes. In the final phase, the received modified data may be validated against a schema, wherein the scheme is associated with the one or more operational requirements associated with the target system. The final phase further comprise formatting the modified data in accordance with each of the one or more determined operational requirements.

In some embodiments, a second input data (e.g., new data 402) may be received by system 100. The second input data may be associated with a second identifier and a second plurality of attributes. System 100 may determine, in response to receiving the second identifier, an absence of control requirements associated with the second input data (e.g., query 406). System 100 may generate, based on the determination that there is an absence of control requirements associated with the second input data, an incident notification (e.g., event 404) and transmit the incident notification. The incident notification can be transmitted to an entity or to a system that routes the incident notification.

In some embodiments, system 100 may receive a second input data associated with a second identifier and a second plurality of attributes. In response to receiving the second identifier, system 100 may determine an absence of control requirements associated with the second input data (e.g., query 406). System 100 may access, in response to the absence of control requirements associated with the second input data, a set of default control requirements. System 100 may then modify the second input data based at least in part on the set of default control requirements and the second plurality of attributes. System 100 may then generate a payload comprising the modified second input data, the set of default control requirements, and the second plurality of attributes.

IV. Computer Systems & Devices

Figure 6:
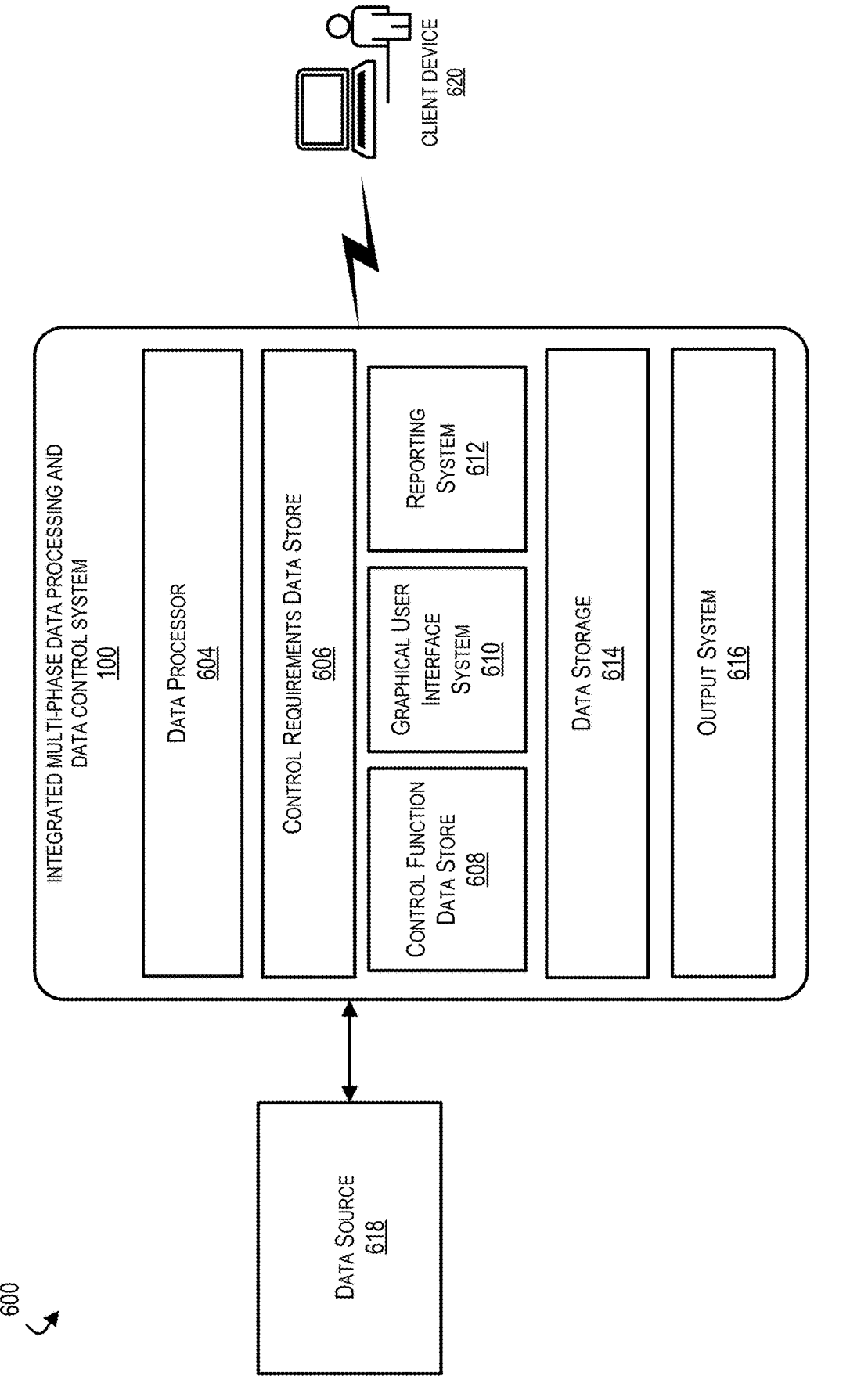
FIG. 6 is a block diagram of an example computing system that can be used to perform aspects of the examples of the present disclosure, in accordance with at least one embodiment.

FIG. 6 is a block diagram of an example computing system 600 that can be used to perform aspects of the examples of the present disclosure, in accordance with at least one embodiment. Computing system 600 may include data source 618, client device 620, and integrated multi-phase data processing and data control system 100 (also referred to as "system 100"). System 100 can be configured to support the processes, methods, operations, and techniques described herein, such as with respect to FIGS. 1-6 and FIG. 7. System 100 may include data processor 804, control requirements data store 606, control function data store 808, graphical user interface system 610, reporting system 812, data storage 614, and output system 616. As one skilled in the art may appreciate, computing system 600 may include additional or fewer components than those depicted in FIG. 6.

Data source 618 may be one or more internal and/or external sources of input data (e.g., input data 102, input data 202A, input data 302A, new data 402). External sources of input data may encompass third-party vendors, partner organizations, public data feeds, external application programming interfaces (APIs), cloud-based data repositories, or data exchanges. Examples include financial market data providers, government open data portals, external customer relationship management (CRM) platforms, or partner file transfer locations using SFTP or FTPS. Internal sources of input data may encompass enterprise databases, transactional systems, operational data stores, internal APIs, on-premises file servers, data warehouses, or other business applications. Examples include point-of-sale systems, ERP databases, application log repositories, internal message queues, or data lakes managed within the organization.

Data source 618 can transmit data in a variety of formats and structures, including but not limited to: CSV files, JSON documents, XML files, binary blobs, or streaming records. Data source 618 may transmit structured, unstructured, or mixed-structure data. Data may be transmitted to the computing system via multiple mechanisms, such as secure file transfer, API calls, direct database queries, message queue delivery, or periodic batch uploads. In some embodiments, data source 618 may also be configured to send event notifications or metadata describing the nature, schema, or creation context of the data being provided. Upon generation or readiness of input data, data source 618 can transmit the input data (either synchronously or asynchronously) to the next component of computing system 600 through a designated interface. This may include pushing files to a monitored cloud storage bucket, invoking a REST or SOAP API endpoint, writing records to a staging database, or publishing messages to a service bus or event stream.

Data processor 604 may receive or request input data from data source 618. Data processor 604 can be configured to support both passive and active data acquisition. In passive scenarios, data processor 604 may be set up to receive data that is pushed from data source 618, such messages published to a message queue or data sent via API callbacks. In active scenarios, data processor 604 may periodically or on-demand initiate requests to data source 618, such as issuing HTTP API calls, performing database queries, polling for new files, and the like. Upon receipt, data processor 604 may perform initial validation, metadata extraction (such as source identifiers, file names, timestamps, or schema versions), and staging of input data for subsequent processing steps within system 100.

Control requirements data store 606 may serve as a centralized repository for storing control requirements that define the integrity checks and processing operations to be applied to input data as it moves through various pipeline phases. Control requirements data store 606 may be implemented as a relational or NoSQL database, a configuration management service, or a structured file system repository (e.g., JSON, YAML, or XML files). Control requirements data store 606 can support querying and retrieval of control requirements based on metadata such as data type, source system, pipeline phase, or operational context. Updates to control requirements can be tracked using versioning, enabling the system to maintain audit trails and support dynamic adaptation to evolving business, regulatory, or technical needs.

Control function data store 608 may provide a repository for storing the logic, code, and/or executable functions that implement the actual validation and processing operations defined by the control requirements. Control function data store 608 may include serverless function definitions (such as AWS Lambda, Azure Functions), container images, application scripts, or pointers to microservices and RESTful APIs. Control function data store 608 may also retain metadata about each control function, such as version information, supported parameters, permissible pipeline phases, and operational dependencies.

Graphical user interface (GUI) system 610 can provide visual interfaces that enable targeted end users to access processed data produced by the system 100. Through dashboards and data views, users may search, filter, and review processed records, inspect validation results and metadata, and trace data lineage across pipeline phases. GUI system 610 may also support exporting data in multiple formats and offering tools for annotating data or initiating downstream actions.

Reporting system 612 may be responsible for disseminating information about the status and outcomes of data processing and integrity management activities. Reporting system 612 can consume log entries, control function results, metadata, and the like from data processor 604 and control requirements data store 606. Reporting system 612 may generate summary reports, detailed audit logs, compliance certifications, and real-time alerts regarding anomalies, validation failures, or threshold breaches. Reporting system

612 may support automated notification deliver as well as scheduled report generation for governance purposes.

Data storage 614 may provide persistent storage for input data, intermediate results, processed outputs, and associated metadata as data traverses the multi-phase pipeline. Data storage 614 can be implemented as a data lake, object storage system, distributed file system, or database cluster, depending on the scale and requirements of the deployment environment. Data storage 614 may support logical partitioning or zoning to organize data by pipeline phase, data type, or other system requirement. Data storage 614 can facilitate traceability and rollback by retaining all versions of data as it moves through system 100, enabling downstream applications or targeted end users to access both raw and processed forms of the data, as well as the results of applied control functions and integrity checks.

Output system 616 may be responsible for generating reports, dashboards, notifications, or automated workflow outputs based on integration pattern data. It can produce visualizations for architectural review, compliance attestations, code or template generation for implementation, and alerts for governance or operational monitoring. The output system 616 may interface with external tools for diagramming, code deployment, compliance tracking, or business intelligence.

Client device 820 may be any suitable device such as a desktop computer, laptop, workstation, tablet, or mobile device, that is capable of interfacing with system 100 over a network connection. Client device 820 may be equipped with a display, input mechanisms (such as a keyboard, mouse, or touchscreen), and an operating system capable of rendering web-based or native graphical user interfaces. Users such as solution architects, technical managers, or integration specialists may interact with the integration architecture platform primarily through this client device. System 100 can be configured to generate a dynamic graphical user interface (GUI) that is rendered on client device 620, enabling users to visualize, filter, select, and manage input data. The GUI may be implemented as a web application, a desktop application, or a hybrid interface, and is transmitted from the graphical user interface system 610 or associated backend components to the client device via secure network protocols (such as HTTPS or WebSocket).

Figure 7:
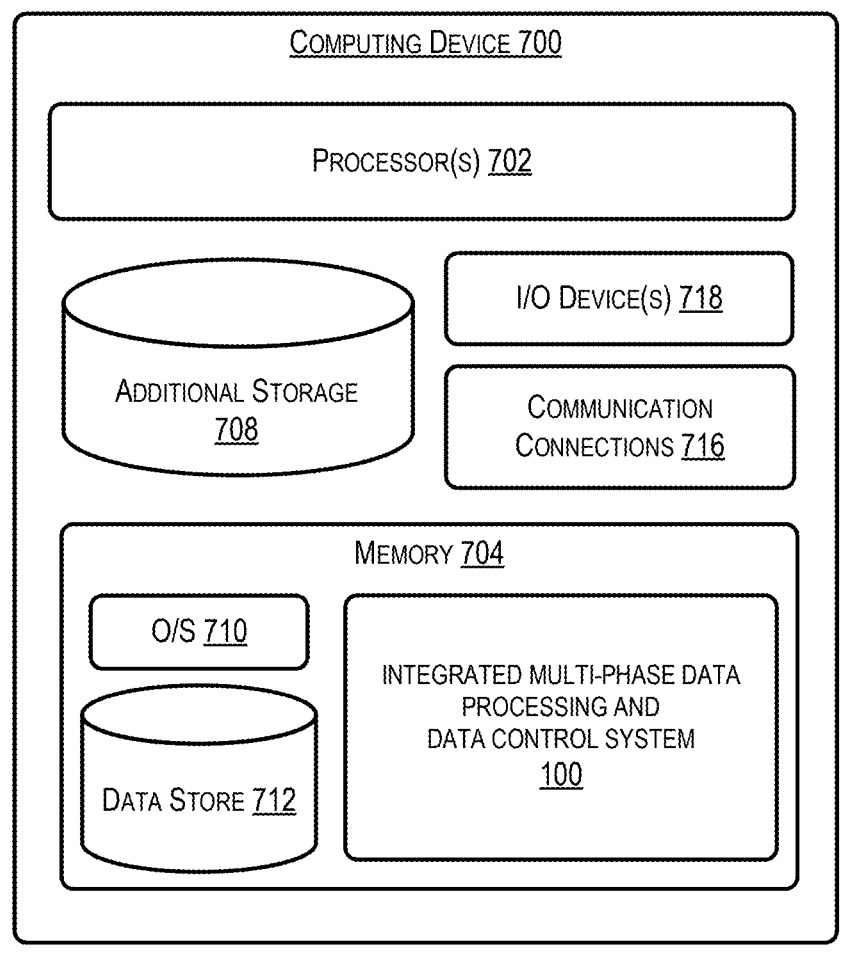
FIG. 7 is a block diagram of an example computing device that can be used to perform aspects of the examples of the present disclosure, in accordance with at least one embodiment.

FIG. 7 illustrates an example computing device 700 that may implement the methods disclosed herein. In some embodiments, the computing device 700 may include one or more processors (e.g., processor(s) 702). The processor(s) 702 may be implemented in hardware, computer-executable instructions, firmware, or combinations thereof. Computer-executable instruction or firmware implementations of the processor(s) 702 may include computer-executable or machine-executable instructions written in any suitable programming language.

Computing device 700 may include memory 704. The memory 704 may store computer-executable instructions that are loadable and executable by the processor(s) 702, as well as data generated during the execution of these programs. The memory 704 may be volatile (such as RAM) and/or non-volatile (such as ROM, flash memory, etc.). The computing device 700 may include additional storage 708, which may include removable storage and/or non-removable storage. The additional storage 708 may include but is not limited to, magnetic storage, optical disks, and/or tape storage. The disk drives and their associated computer-readable media may provide non-volatile storage of computer-readable instructions, data structures, program engines, and other data for the computing devices. In some implementations, the memory 704 or additional storage 708 may individually, or collectively, include multiple different types of memory, such as SRAM, DRAM, or ROM.

The memory 704 and/or additional storage 708 may be examples of computer-readable storage media. Computer-readable storage media may include volatile, non-volatile, removable, or non-removable media implemented in any method or technology for storage of information such as computer-readable instructions, data structures, program engines, or other data. In some embodiments, memory 704 and the additional storage 708 are examples of computer storage media. Memory 704 and/or additional storage 708 may include but are not limited to, PRAM, SRAM, DRAM, RAM, ROM, EEPROM, flash memory or other memory technology, CD-ROM, DVD, magnetic tape, magnetic disk storage or other magnetic storage devices, or any other medium which can be used to store the desired information and which can be accessed by the computing device 700. Combinations of any of the above should also be included within the scope of computer-readable media. Computer-readable media may include computer-readable instructions, program engines, or other data transmitted within a data signal, such as a carrier wave, or other transmission. However, as used herein, computer-readable storage media does not include computer-readable communication media.

The memory 704 may include an operating system 710 and one or more data stores 712, and/or one or more application programs, engines, or services for implementing the features disclosed herein, such as the features provided by the integration architecture system 802 (an example of integration architecture system 110 of FIG. 1).

The computing device may also contain communications connection(s) 716 that allow the computing device 700 to communicate with a stored database, another computing device, a server, user terminals, and/or other devices (e.g., via one or more networks, not depicted). The computing device may also include I/O device(s) 718, such as a keyboard, a mouse, a pen, a voice input device, a touch input device, a display, speakers, a printer, etc.

In one exemplary embodiment, the techniques described herein are utilized to support the ingestion, transformation, validation, and distribution of a variety of financial data streams for a financial institution. The system may operate in a hybrid environment that integrates cloud-based data lakes with on-premises infrastructure, such as core financial services and applications, regulatory reporting systems, and business intelligence platforms. Input data may originate from both internal and external sources, including batches of transaction records uploaded by retail branches, daily settlement files from payment network partners, real-time trading data feeds, loan origination records, wire transfer logs, and customer account updates from online banking channels. These data inputs may arrive in formats such as CSV, fixed-width text files, JSON, XML, or proprietary binaries, and may be transmitted via secure file transfer, API integration, or message queues.

Upon arrival, data is may be first ingested by an intake system where initial quality checks relevant to financial operations, such as confirming the presence of required metadata and scanning for malware or unauthorized content. Metadata, including transaction type, originating system, schema version, and file creation timestamp, can be extracted and recorded at this stage. The ingested data may then be staged in a designated partition of the financial institution's data lake, which may be implemented using a secure cloud object store with encryption and access controls. Processing may then continue through a multi-phase pipeline, with each phase tailored to specific financial data management needs. In the first phase, the system applies control requirements such as record count verification, duplicate transaction detection using composite transaction identifiers, and field-level format enforcement for elements like account numbers or currency codes. Control functions may include parsing logic for various formats, normalization of currency codes, and standardization of date fields. In the subsequent curated phase, transaction records are enriched by joining with internal reference data, such as customer master tables and product hierarchies, while reconciliation functions cross-verify inbound payments against settlement amounts and flag exceptions for review. Tolerance thresholds can be applied to allow acceptable variances, for example, in currency conversions.

In the compliance and regulatory validation phase, business rules and compliance checks are enforced, including anti-money laundering screening, sanctions list matching, detection of suspicious patterns, and validation of required fields for regulatory filings. The system may apply masking or encryption to personally identifiable information prior to further processing, supporting compliance with privacy regulations. In the final outbound phase, validated and enriched data is formatted for delivery to target systems, which may include conversion to mainframe-compatible formats, generation of outbound files for industry standards, and creation of control files summarizing batch details and checksums. Throughout all phases, the system stores intermediate and final data outputs in phase-specific data stores within the data lake, ensuring traceability and supporting rollback if necessary. Control requirement results, metadata, and processing context are aggregated into structured payloads to enable seamless handoff between phases and facilitate downstream operations.

If a new data type is introduced, such as a newly mandated regulatory format or a novel transaction feed from a fintech partner, the system detects the unrecognized type by analyzing metadata and issues an incident notification to the data governance team. New control requirements and processing logic can then be configured and registered, allowing the pipeline to adapt to evolving operational and regulatory needs without disrupting existing data flows. After successful completion of all pipeline phases, the final processed data is transmitted to the institution's internal mainframe for posting to core banking system or regulatory reporting. The system can integrate with identity and access management solutions to ensure that only authorized personnel access sensitive data, and all processing steps are logged for end-to-end auditability.

The various embodiments further can be implemented in a wide variety of operating environments, which in some cases can include one or more user computers, computing devices, or processing devices that can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art of supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from electronic devices, such as by executing one or more Web applications that may be implemented as one or more scripts or programs written in any programming language, such as Java®, C, C#, or C++, or any scripting language, such as JavaScript, Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as suitable. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flashcards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, engines, services, or other elements located within at least one working memory device, including an operating system and application programs, such as a client application or Web browser. It should be appreciated that alternate embodiments may have numerous variations from that described above. For example, customized hardware might also be used, and/or particular elements might be implemented in hardware, software (including portable software, such as applets), or both. Further, connection to other computing devices such as network input/output devices may be employed.

Storage media computer readable media for containing code, or portions of code, can include any suitable media known or used in the art, including storage media and communication media, such as but not limited to volatile and non-volatile, removable and non-removable media implemented in any method or technology for storage and/or transmission of information such as computer readable instructions, data structures, program engines, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein is merely intended to serve as a shorthand method of referring individually to each separate value falling within the range unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The order of the blocks presented in the examples above can be varied, for example, blocks can be re-ordered, combined, and/or broken into sub-blocks. Certain blocks or processes can be performed in parallel. The inventors expect skilled artisans to employ such variations as suitable and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Additionally, some, any, or all of the processes described herein may be performed under the control of one or more computer systems configured with specific executable instructions and may be implemented as code (e.g., executable instructions, one or more computer programs, or one or more applications) executing collectively on one or more processors, by hardware, or combinations thereof. As noted above, the code may be stored on a non-transitory computer readable storage medium, for example, in the form of a computer program including a plurality of instructions executable by one or more processors.

What is claimed is:

1. A method comprising:
   receiving a first input data for processing at a multi-phase data processing pipeline, wherein the first input data is associated with a first identifier and a first plurality of attributes;
   responsive to receiving the first identifier, determining one or more control requirements of a plurality of control requirements associated with a first phase of the multi-phase data processing pipeline, wherein the one or more control requirements is determined at least in part by the first plurality of attributes;
   performing, for the first phase of the multi-phase data processing pipeline, operations to generate a set of control requirement results, the operations comprising:
      determining a function from a plurality of functions, wherein the function is associated with a respective control requirement of the plurality of control requirements;
      executing the function to determine a control requirement result, wherein the control requirement result is associated with a respective attribute of the first plurality of attributes; and
      storing the control requirement result;

responsive to generating the set of control requirement results, modifying the first input data based at least in part on the set of control requirement results and in accordance with requirements associated with the first phase;
   storing the modified first input data to a data store;
   generating a payload comprising the modified first input data, the set of control requirement results, and the first plurality of attributes;
   determining, based at least in part on the first phase of the multi-phase data processing pipeline, a second phase; and
   transmitting the payload to the second phase of the multi-phase data processing pipeline.

2. The method of claim 1, wherein the second phase is an intermediate phase of the multi-phase data processing pipeline.

3. The method of claim 2, further comprising:
   receiving the payload comprising the modified data, the set of control requirement results, and the first plurality of attributes;
   determining, from the set of control requirement results, that one or more tolerance thresholds has been exceeded;
   responsive to the determination that one or more tolerance thresholds is exceeded, generating an incident notification;
   transmitting the incident notification; and
   aborting further processing of the payload.

4. The method of claim 1, wherein the second phase is a final phase of the multi-phase data processing pipeline, the final phase comprising:
   determining one or more operational requirements associated with a target system, wherein the target system is determined based on at least one of the first identifier or the first plurality of attributes;
   validating the modified data against a schema, wherein the schema is associated with the one or more operational requirements associated with the target system; and
   for each of the one or more operational requirements, formatting the modified data in accordance with a respective operational requirement.

5. The method of claim 1, wherein the payload is generated with a subset of the respective set of control requirements, the subset being determined based on the first plurality of attributes.

6. The method of claim 1, further comprising:
   receiving second input data, wherein the second input data is associated with a second identifier and a second plurality of attributes;
   responsive to receiving the second identifier, determining an absence of control requirements associated with the second input data;
   generating, based on the absence of control requirements associated with the second input data, an incident notification; and
   transmitting the incident notification.

7. The method of claim 1, further comprising:
   receiving a second input data, wherein the second input data is associated with a second identifier and a second plurality of attributes;
   responsive to receiving the second identifier, determining an absence of control requirements associated with the second input data;

responsive to determining the absence of control requirements associated with the second input data, accessing a set of default control requirements;

modifying the second input data based at least in part on the set of default control requirements and the second plurality of attributes; and generating a payload comprising the modified second input data, the set of default control requirements, and the second plurality of attributes.

8. The method of claim 1, wherein the control requirements comprise at least one of:

a duplicate record check, a record count verification, an empty file detection, a schema validation, or a checksum verification.

9. A system comprising:

a processing system; and a memory configured to store computer-executable instructions; and a processor configured to access the memory and execute the computer-executable instructions to at least:

receive a first input data for processing at a multi-phase data processing pipeline, wherein the first input data is associated with a first identifier and a first plurality of attributes;

responsive to receiving the first identifier, determining one or more control requirements of a plurality of control requirements associated with a first phase of the multi-phase data processing pipeline, wherein the one or more control requirements is determined at least in part by the first plurality of attributes;

performing, for the first phase of the multi-phase data processing pipeline, operations to generate a set of control requirement results, the operations comprising:

determining a function from a plurality of functions, wherein the function is associated with a respective control requirement of the plurality of control requirement;

executing the function to determine a control requirement result, wherein the control requirement result is associated with a respective attribute of the first plurality of attributes; and storing the control requirement result;

responsive to generating the set of control requirement results, modifying the first input data based at least in part on the set of control requirement results and in accordance with requirements associated with the first phase;

storing the modified first input data to a data store;

generating a payload comprising the modified first input data, the set of control requirement results, and the first plurality of attributes;

determining, based at least in part on the first phase of the multi-phase data processing pipeline, a second phase; and transmitting the payload to the second phase of the multi-phase data processing pipeline.

10. The system of claim 9, wherein the second phase is an intermediate phase of the multi-phase data processing pipeline.

11. The system of claim 10, wherein execution of the computer-executable instructions further causes the processor to at least:

receive the payload comprising the modified data, the set of control requirement results, and the first plurality of attributes;

determine, from the set of control requirement results, that one or more tolerance thresholds has been exceeded;

responsive to the determination that one or more tolerance thresholds is exceeded, generate an incident notification;

transmit the incident notification; and abort further processing of the payload.

12. The system of claim 9, wherein the second phase is a final phase of the multi-phase data processing and wherein execution of the computer-executable instructions further causes the process to at least:

determine one or more operational requirements associated with a target system, wherein the target system is determined based on at least one of the first identifier or the first plurality of attributes;

validate the modified data against a schema, wherein the schema is associated with the one or more operational requirements associated with the target system; and for each of the one or more operational requirements, format the modified data in accordance with a respective operational requirement.

13. The system of claim 9, wherein the payload is generated with a subset of the respective set of control requirements, the subset being determined based on the first plurality of attributes.

14. The system of claim 9, wherein execution of the computer-executable instructions further causes the processor to at least:

receive second input data, wherein the second input data is associated with a second identifier and a second plurality of attributes;

responsive to receiving the second identifier, determine an absence of control requirements associated with the second input data;

generate, based on the absence of control requirements associated with the second input data, an incident notification; and transmit the incident notification.

15. The system of claim 9, wherein execution of the computer-executable instructions further causes the processor to at least:

receive a second input data, wherein the second input data is associated with a second identifier and a second plurality of attributes;

responsive to receiving the second identifier, determine an absence of control requirements associated with the second input data; and responsive to determining the absence of control requirements associated with the second input data, access a set of default control requirements.

16. A one or more non-transitory computer-readable media storing computer-readable instructions that, when executed by one or more processors, cause a system to perform operations comprising:

receiving a first input data for processing at a multi-phase data processing pipeline, wherein the first input data is associated with a first identifier and a first plurality of attributes;

responsive to receiving the first identifier, determining one or more control requirements of a plurality of control requirements associated with a first phase of the multi-phase data processing pipeline, wherein the one or more control requirements is determined at least in part by the first plurality of attributes;

performing, for the first phase of the multi-phase data processing pipeline, operations to generate a set of control requirement results, the operations comprising:

determining a function from a plurality of functions, wherein the function is associated with a respective control requirement of the plurality of control requirement;

executing the function to determine a control requirement result, wherein the control requirement result is associated with a respective attribute of the first plurality of attributes; and storing the control requirement result;

responsive to generating the set of control requirement results, modifying the first input data based at least in part on the set of control requirement results and in accordance with requirements associated with the first phase;

storing the modified first input data to a data store;

generating a payload comprising the modified first input data, the set of control requirement results, and the first plurality of attributes;

determining, based at least in part on the first phase of the multi-phase data processing pipeline, a second phase; and transmitting the payload to the second phase of the multi-phase data processing pipeline.

17. The one or more non-transitory computer-readable media of claim 16, wherein the second phase is an intermediate phase of the multi-phase data processing pipeline.

18. The one or more non-transitory computer-readable media of claim 17, the operations further comprising:

receiving the payload comprising the modified data, the set of control requirement results, and the first plurality of attributes;

determining, from the set of control requirement results, that one or more tolerance thresholds has been exceeded;

responsive to the determination that one or more tolerance thresholds is exceeded, generating an incident notification;

transmitting the incident notification; and aborting further processing of the payload.

19. The one or more non-transitory computer-readable media of claim 16, wherein the second phase is a final phase of the multi-phase data processing pipeline, and the operations further comprising:

determining one or more operational requirements associated with a target system, wherein the target system is determined based on at least one of the first identifier or the first plurality of attributes;

validating the modified data against a schema, wherein the schema is associated with the one or more operational requirements associated with the target system; and for each of the one or more operational requirements, formatting the modified data in accordance with a respective operational requirement.

20. The one or more non-transitory computer-readable media of claim 16, wherein the payload is generated with a subset of the respective set of control requirements, the subset being determined based on the first plurality of attributes.

\* \* \* \* \*